United States Patent
Yamamoto et al.

(10) Patent No.: US 9,222,525 B2
(45) Date of Patent: Dec. 29, 2015

(54) DRIVING FORCE TRANSMISSION APPARATUS AND CONTROLLER FOR DRIVING FORCE TRANSMISSION APPARATUS

(71) Applicant: JTEKT Corporation, Osaka-shi (JP)

(72) Inventors: Takeshi Yamamoto, Izumisano (JP); Hiroshi Kushino, Obu (JP); Kunihiko Suzuki, Gamagori (JP); Noriyuki Fujii, Hekinan (JP); Takashi Hosokawa, Takahama (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/219,383

(22) Filed: Mar. 19, 2014

(65) Prior Publication Data

US 2014/0284163 A1  Sep. 25, 2014

(30) Foreign Application Priority Data

Mar. 25, 2013 (JP) .................................. 2013-062405
Jul. 10, 2013 (JP) .................................. 2013-144843

(51) Int. Cl.
*F16D 13/54* (2006.01)
*F16D 23/12* (2006.01)
*G01L 1/12* (2006.01)
*F16D 28/00* (2006.01)
*F16D 48/02* (2006.01)

(52) U.S. Cl.
CPC ............. *F16D 23/12* (2013.01); *F16D 13/54* (2013.01); *F16D 28/00* (2013.01); *G01L 1/12* (2013.01); *F16D 2023/123* (2013.01); *F16D 2048/0203* (2013.01); *F16D 2500/1024* (2013.01); *F16D 2500/10431* (2013.01); *F16D 2500/3028* (2013.01); *F16D 2500/70211* (2013.01); *F16D 2500/70223* (2013.01)

(58) Field of Classification Search
CPC ..... F16D 13/54; F16D 2023/123; F16D 28/00; F16D 2500/70223; F16D 2500/70211; F16D 2500/3028; G01L 1/12; G01R 31/18
See application file for complete search history.

(56) References Cited

U.S. PATENT DOCUMENTS 7,677,374 B2     3/2010  Grunwald et al.
7,765,877 B2 *   8/2010  Venkataraghavan et al. ... 73/777
2002/0079178 A1* 6/2002  Takuno et al. ................. 192/35

(Continued)

FOREIGN PATENT DOCUMENTS

JP          2007-78134            3/2007

*Primary Examiner* — Rodney H Bonck
*Assistant Examiner* — Lillian Nguyen
(74) *Attorney, Agent, or Firm* — Oblon, McClelland, Maier & Neustadt, L.L.P.

(57) ABSTRACT

A driving force transmission apparatus includes: an electric motor; a multi-disc clutch including outer clutch plates and inner clutch plates that are disposed coaxially with each other so as to be rotatable relative to each other and that are frictionally engaged with each other by being pressed in an axial direction; an input rotary member that rotates together with the outer clutch plates; an output rotary member that rotates together with the inner clutch plates; a cam mechanism that generates cam thrust force for pressing the multi-disc clutch in the axial direction upon reception of torque generated by the electric motor; a strain sensor that detects reaction force against the cam thrust force; and a spring member that is disposed between the cam mechanism and the strain sensor and that buffers an impact transmitted from the cam mechanism to the strain sensor.

13 Claims, 19 Drawing Sheets

(56) References Cited

U.S. PATENT DOCUMENTS

| | | |
|---|---|---|
| 2006/0011441 A1* | 1/2006 | Showalter .................... 192/84.6 |
| 2007/0169560 A1* | 7/2007 | Zumberge et al. .............. 73/777 |
| 2008/0011577 A1* | 1/2008 | Burkhart et al. ............ 192/85 R |
| 2012/0247914 A1* | 10/2012 | Chambrion et al. .......... 192/207 |
| 2013/0205609 A1* | 8/2013 | Gambini et al. ................ 33/561 |
| 2013/0256083 A1* | 10/2013 | Fujii et al. .................. 192/70.23 |

\* cited by examiner

DRIVING FORCE TRANSMISSION APPARATUS AND CONTROLLER FOR DRIVING FORCE TRANSMISSION APPARATUS

INCORPORATION BY REFERENCE

The disclosure of Japanese Patent Applications No. 2013-062405 filed on Mar. 25, 2013 and No. 2013-144843 filed on Jul. 10, 2013 each including the specification, drawings and abstract, is incorporated herein by reference in its entirety.

BACKGROUND OF THE INVENTION

1. Field of the Invention

The invention relates to a driving force transmission apparatus that transmits driving force from an input shaft to an output shaft, and a controller that controls the driving force transmission apparatus.

2. Description of Related Art

There is a conventional driving force transmission apparatus that is mounted in, for example, a four-wheel-drive vehicle, and in which a first rotary member and a second rotary member are connected to each other by a clutch such that driving force is transmittable therebetween (refer to, for example, Japanese Patent Application Publication No. 2007-78134 (JP 2007-78134 A)).

The driving force transmission apparatus (driving force distribution apparatus) described in JP 2007-78134A includes a first rotary member (rear wheel output shaft), a second rotary member (clutch drum), a clutch and a cam mechanism. The second rotary member is disposed coaxially with the first rotary member so as to be rotatable relative to the first rotary member. The clutch is disposed between the first rotary member and the second rotary member. The cam mechanism converts the torque generated by an electric motor (servomotor) into pressing force (thrust force) headed toward the clutch. The first rotary member is directly connected to an input shaft into which driving force generated by an engine is input via a transmission. The second rotary member is connected to a front wheel output shaft via a chain belt.

The cam mechanism includes a first ball cam, a second ball cam and a drive gear. The first ball cam has an external gear. The second ball cam has an internal gear. The drive gear meshes with both the external gear and the internal gear. The cam mechanism is configured such that the drive gear is driven by the electric motor via a speed reducer. As the drive gear is rotated upon reception of the torque from the electric motor, relative rotation between the first ball cam and the second ball cam generates the thrust force that presses the clutch in the axial direction.

When the driving force from the engine is input in the first rotary member via the input shaft, the first rotary member rotates about its axis. When the driving force from the engine is distributed to the front wheel side via the clutch, the electric motor is energized to operate the cam mechanism. Upon reception of the torque from the electric motor, the cam mechanism generates the thrust force that presses the clutch. As the thrust force is applied to the clutch, the first rotary member and the second rotary member are connected to each other such that the driving force is transmittable therebetween. Thus, the driving force from the engine is transmitted from the input shaft to the front wheel output shaft via the driving force transmission apparatus.

The driving force that is transmitted from the first rotary member to the second rotary member is controlled by increasing or decreasing current that is supplied to the electric motor, thereby adjusting the thrust force that is generated by the cam mechanism. However, due to variations in the friction resistance in the speed reducer, variations in the output characteristics of the electric motor, or variations in the characteristics of a controller that supplies current to the electric motor, there is a possibility that the driving force corresponding to the current supplied to the electric motor will not be transmitted via the clutch.

In the light of the above-described circumstances, the inventors of the present invention came up with an idea that the thrust force that is generated by the cam mechanism is accurately controlled by detecting a reaction force, which is generated by reaction of the thrust force generated by the cam mechanism, using a sensor. However, for example, if an impact is applied to the sensor due to sudden rotation of the electric motor, the sensor is damaged and thus the reaction force is not accurately detected in some cases.

SUMMARY OF THE INVENTION

One object of the invention is to provide a driving force transmission apparatus and a controller for the driving force transmission apparatus that are configured to accurately adjust thrust force of a cam mechanism that presses a clutch and to reduce damage to a sensor that detects a reaction force.

An aspect of the invention relates to a driving force transmission apparatus including: an electric motor; a clutch including a first friction member and a second friction member that are disposed coaxially with each other so as to be rotatable relative to each other and that are frictionally engaged with each other by being pressed in an axial direction; an input rotary member that rotates together with the first friction member; an output rotary member that rotates together with the second friction member; a cam thrust force generating mechanism that generates cam thrust force for pressing the clutch in the axial direction upon reception of torque generated by the electric motor; a detector that detects reaction force against the cam thrust force; and a buffer that buffers an impact transmitted from the cam thrust force generating mechanism to the detector.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
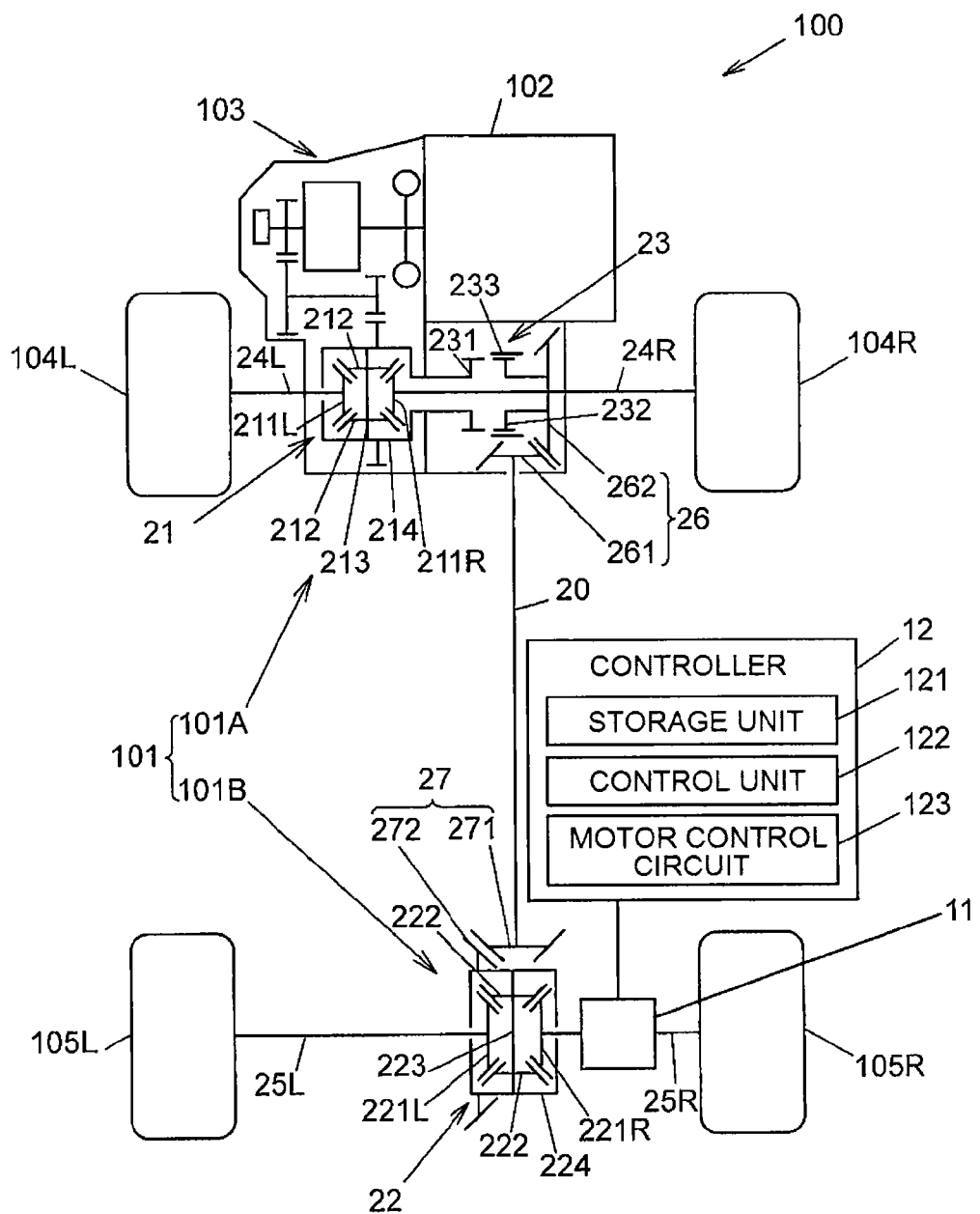
FIG. 1 is a configuration diagram schematically illustrating a four-wheel-drive vehicle in which a driving force transmission apparatus and a controller for the driving force transmission apparatus according to a first embodiment of the invention are mounted.

FIG. 1 is a configuration diagram schematically illustrating a four-wheel-drive vehicle 100 in which a driving force transmission apparatus 11 and a controller 12 for the driving force transmission apparatus 11 according to a first embodiment of the invention are mounted.

The four-wheel-drive vehicle 100 includes a driving force transmission system 101, a driving force transmission apparatus 11, a controller 12, an engine 102 that serves as a main drive source, a transmission 103, front wheels 104R 104L that serve as main drive wheels, and rear wheels 105R, 105L that serve as auxiliary drive wheels. In FIG. 1, "L" in the reference symbols indicates the left side with respect to the direction in which the four-wheel-drive vehicle 100 travels forward, and "R" in the reference symbols indicates the right side with respect to the direction in which the four-wheel-drive vehicle 100 travels forward.

The driving force transmission system 101 includes a front wheel-side driving force transmission system 101A, a rear wheel-side driving force transmission system 101B, and a propeller shaft 20. The propeller shaft 20 connects the front wheel-side driving force transmission system 101A and the rear wheel-side driving force transmission system 101B to each other. The driving force transmission system 101 is configured to be capable of switching the four-wheel-drive vehicle 100 from a four-wheel-drive mode to a two-wheel-drive mode, or from the two-wheel-drive mode to the four-wheel-drive mode. The driving force transmission system 101 is disposed together with a front differential 21 and a rear differential 22, in a driving force transmission path that extends from the transmission 103 to the rear wheels 105R, 105L in the four-wheel-drive vehicle 100. The driving force transmission system 101 is mounted in a vehicle body (not illustrated) of the four-wheel-drive vehicle 100.

The front wheel-side driving force transmission system 101A includes the front differential 21 and a driving force interrupter 23. The front wheel-side driving force transmission system 101A is disposed on the front wheels 104R, 104L side of the propeller shaft 20.

The front differential 21 includes side gears 211R, 211L, a pair of pinion gears 212, a gear support member 213 and a front differential case 214. The pinion gears 212 are rotatably supported by the gear support member 213. The front differential case 214 accommodates the side gears 211R, 211L and the pinion gears 212. The front differential 21 is connected to the transmission 103. The side gear 211L is connected to an axle shaft 24L on the front wheel 104L side. The side gear 211R is connected to an axle shaft 24R on the front wheel 104R side. The pinion gears 212 mesh with the side gears 211R, 211L with their gear axes extending perpendicularly to the gear axes of the side gears 211R, 211L.

The driving force interrupter 23 is a dog clutch including a first spline tooth portion 231, a second spline tooth portion 232 and a sleeve 233. The driving force interrupter 23 is disposed on the front wheels 104R, 104L side in the four-wheel-drive vehicle 100. The sleeve 233 is advanced or retracted by an actuator (not illustrated). The first spline tooth portion 231 is connected to the front differential case 214 so as to be non-rotatable relative to the front differential case 214. The second spline tooth portion 232 is connected to a ring gear 262 so as to be non-rotatable relative to the ring gear 262. The sleeve 233 is connected to the first spline tooth portion 231 and the second spline tooth portion 232 so as to be spline-fittable to the first spline tooth portion 231 and the second spline tooth portion 232. With this configuration, the driving force interrupter 23 connects the propeller shaft 20 to the front differential case 214 such that the propeller shaft 20 is disengageable from the front differential case 214.

The rear wheel-side driving force transmission system 101B includes the rear differential 22 and the driving force transmission apparatus 11. The rear wheel-side driving force transmission system 101B is disposed on the rear wheels 105R, 105L side of the propeller shaft 20.

The rear differential 22 has side gears 221R, 221L, a pair of pinion gears 222, a gear support member 223 and a rear differential case 224. The pinion gears 222 are rotatably supported by the gear support member 223. The rear differential case 224 accommodates the side gears 221R, 221L and the pinion gears 222. The rear differential 22 is connected to the propeller shaft 20. The pinion gears 222 mesh with the side gears 221R, 221L with their gear axes extending perpendicularly to the gear axes of the side gears 221R, 221L. The side gear 221L is connected to an axle shaft 25L on the rear wheel 105L side. The side gear 221R is connected to an axle shaft 25R on the rear wheel 105R via the driving force transmission apparatus 11.

The driving force transmission apparatus 11 is able to establish or interrupt connection between the side gear 221R of the rear differential 22 and the axle shaft 25R. If the side gear 221R of the rear differential 22 and the axle shaft 25R are disconnected from each other, the driving force generated by the engine 102 is no longer transmitted to the rear wheel 105R. At the same time, transmission of the driving force to the rear wheel 105L is interrupted due to idle rotation of the side gears 221R, 221L of the rear differential 22 and the pinion gears 222.

On the other hand, when the side gear 221R of the rear differential 22 and the axle shaft 25R are connected to each other, the driving force generated by the engine 102 is transmitted to the rear wheel 105R. At the same time, the driving force is transmitted also to the rear wheel 105L via the side gear 221L of the rear differential 22. As a result, the four-wheel-drive vehicle 100 is placed in the four-wheel-drive mode.

The front wheels 104R, 104L are driven by the driving force generated by the engine 102 and transmitted to the axle shafts 24R, 24L via the transmission 103 and the front differential 21. The rear wheel 105L is driven by the driving force generated by the engine 102 and transmitted to the axle shaft 25L via the transmission 103, the driving force interrupter 23, the propeller shaft 20 and the rear differential 22. The rear wheel 105R is driven by the driving force generated by the engine 102 and transmitted to the axle shaft 25R via the transmission 103, the driving force interrupter 23, the propeller shaft 20, the rear differential 22 and the driving force transmission apparatus 11.

A front wheel-side gear mechanism 26 including a drive pinion 261 and the ring gear 262 that mesh with each other is disposed at the front wheel 104R, 104L-side end portion of the propeller shaft 20. A rear wheel-side gear mechanism 27 including a drive pinion 271 and a ring gear 272 that mesh with each other is disposed at the rear wheel 105R, 105L-side end portion of the propeller shaft 20.

The controller 12 includes a storage unit 121, a control unit 122 and a motor control circuit 123. The storage unit 121 is formed of storage elements such as a read only memory (ROM) and a random access memory (RAM). The control unit 122 includes a central processing unit (CPU) that operates according to a program stored in the storage unit 121. The motor control circuit 123 controls an electric motor 5 (described later) of the driving force transmission apparatus 11. When the current is supplied to the electric motor 5 by the motor control circuit 123, the driving force generated by the engine 102 is transmitted from the side gear 221R of the rear differential 22 to the axle shaft 25R by the driving force transmission apparatus 11. On the other hand, if the supply of current to the electric motor 5 is stopped, the side gear 221R of the rear differential 22 and the axle shaft 25R are disconnected from each other.

Figure 2:
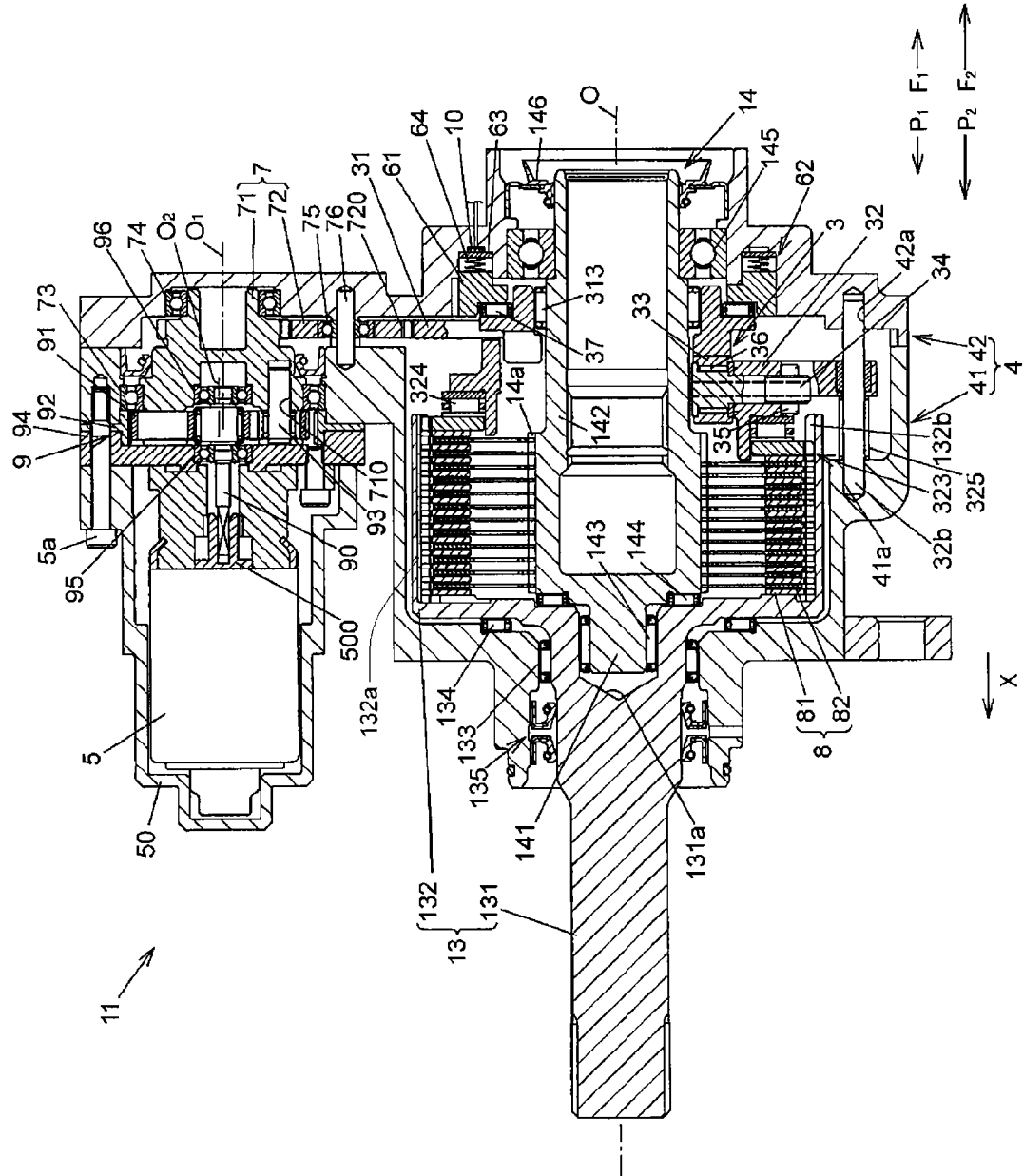
FIG. 2 is a sectional view illustrating an example of the configuration of the driving force transmission apparatus.

FIG. 2 is a sectional view illustrating an example of the configuration of the driving force transmission apparatus 11. In FIG. 2, the upper side with respect to a rotation axis O indicates the non-operating state and the lower side with respect to the rotation axis O indicates the operating state.

The driving force transmission apparatus 11 includes the electric motor 5, a speed reduction mechanism 9, a multi-disc clutch 8, an input rotary member 13, an output rotary member 14, a cam mechanism 3, a piston 61, a detector, a buffer and a housing 4. The speed reduction mechanism 9 reduces the speed of rotation transmitted from an output shaft 500 of the electric motor 5. The multi-disc clutch 8 includes a plurality of outer clutch plates 81, which may function as a first friction member, and a plurality of inner clutch plates 82, which may function as a second friction member. The input rotary member 13 rotates together with the outer clutch plates 81. The output rotary member 14 rotates together with the inner clutch plates 82. The cam mechanism 3 is a cam thrust force generating mechanism that generates axial thrust force (pressing force) from the torque generated by the electric motor 5. The piston 61 receives reaction force against the thrust force generated by the cam mechanism 3. The detector detects the reaction force based on the pressing force of the piston 61. The buffer absorbs an impact applied from the cam mechanism 3 to the detector. The housing 4 includes a main body 41 and a lid 42.

In the present embodiment, the detector includes a diaphragm 63 and a strain sensor 10. The diaphragm 63 is a deformation member that elastically deforms upon reception of the reaction force from the cam mechanism 3. The strain sensor 10 detects a deformation amount (strain amount) of the diaphragm 63. The buffer is formed of a spring member 64 disposed between the cam mechanism 3 (piston 61) and the detector. The diaphragm 63, the strain sensor 10 and the spring member 64 are accommodated in an accommodation portion 62 formed in the lid 42. Lubricating oil (not illustrated) is sealed in the housing 4.

The input rotary member 13 is a single-piece member having a shaft portion 131 and a cylindrical portion 132 having a bottomed cylinder shape. The axis of the shaft portion 131 coincides with the rotation axis O. The cylindrical portion 132 opens toward the side (cam mechanism 3 side) opposite to the shaft portion 131. The input rotary member 13 is rotatably supported by the inner face of the main body 41 of the housing 4 via needle roller bearings 133, 134. The shaft portion 131 is connected to the side gear 221R (refer to FIG. 1) of the rear differential 22 by spline-fitting. The gap between the outer peripheral face of the shaft portion 131 and the inner face of the main body 41 of the housing 4 is sealed with a pair of sealing mechanisms 135 arranged next to each other along the direction of the rotation axis O.

The output rotary member 14 is a single-piece member having a shaft-shaped boss portion 141 and a cylindrical portion 142 having a bottomed cylinder shape. The axis of the boss portion 141 coincides with the rotation axis O. The cylindrical portion 142 opens toward the side (the rear wheel 105R side illustrated in FIG. 1) opposite to the boss portion 141. The output rotary member 14 is rotatably supported by the inner face of the cylindrical portion 132 of the input rotary member 13 via needle roller bearings 143, 144. The output rotary member 14 is rotatably supported by the lid 42 of the housing 4 via a ball bearing 145. A distal end portion of the axle shaft 25R (refer to FIG. 1) is inserted into the output rotary member 14 through an opening thereof. The axle shaft 25R is connected to the output rotary member 14 by spline-fitting so as not to be non-rotatable relative to the output rotary member 14 and so as to be movable relative to the output rotary member 14 in the direction of the rotation axis O.

The boss portion 141 is accommodated in a recessed portion 131a formed in the cylindrical portion 132-side end portion of the shaft portion 131 of the input rotary member 13. The outer diameter of the boss portion 141 is set smaller than the outer diameter of the cylindrical portion 142. The gap between the outer peripheral face of an opening-side portion of the cylindrical portion 142 and the inner face of the lid 42 of the housing 4 is sealed with a seal member 146.

The multi-disc clutch 8 is disposed between the input rotary member 13 and the output rotary member 14. The outer clutch plates 81 and the inner clutch plates 82 of the multi-disc clutch 8 are alternately arranged on the same axis (on the rotation axis O) so as to be rotatable relative to each other, and are frictionally engaged with each other by being pressed in the direction of the rotation axis O.

The outer clutch plates 81 are spline-fitted to a straight spline fitting portion 132a formed on the inner peripheral face of the cylindrical portion 132 of the input rotary member 13. The outer clutch plates 81 are connected to the input rotary member 13 so as to be non-rotatable relative to the input rotary member 13 and so as to be movable relative to the input rotary member 13 in the direction of the rotation axis O.

The inner clutch plates 82 are spline-fitted to a straight spline fitting portion 14a formed on the outer peripheral face of the cylindrical portion 142 of the output rotary member 14. The inner clutch plates 82 are connected to the output rotary member 14 so as to be non-rotatable relative to the output rotary member 14 and so as to be movable relative to the output rotary member 14 in the direction of the rotation axis O.

The electric motor 5 is accommodated in an electric motor housing 50. The electric motor housing 50 that accommodates the electric motor 5 is attached to the main body 41 of the housing 4 with a bolt 5a. The electric motor is a generic term for devices that convert electrical energy into mechanical energy and includes an actuator that turns within a limited angle range. The output shaft 500 of the electric motor 5 is connected to the cam mechanism 3 via the speed reduction mechanism 9 and a gear transmission mechanism 7.

The gear transmission mechanism 7 includes a first gear 71 and a second gear 72. The first gear 71 is disposed on a rotation axis $O_1$ of the speed reduction mechanism 9, and is rotatably supported by the inner face of the housing 4 via ball bearings 73, 74. The second gear 72 is disposed such that a gear portion 720 meshes with the first gear 71, and is rotatably supported by a support shaft 76 via a ball bearing 75. The gear transmission mechanism 7 receives the rotation, which is output from the electric motor 5 and of which the speed is reduced by the speed reduction mechanism 9, from the output shaft 500, and transmits the rotation with a reduced speed to the cam mechanism 3. The rotation axis of the output shaft 500 coincides with the rotation axis $O_1$ of the speed reduction mechanism 9.

In the housing 4, a plurality of (three in the present embodiment) guide members 32b is disposed between the main body 41 and the lid 42 so as to be parallel to the rotation axis O. Each guide member 32b has a columnar shape. One axial end portion of each guide member 32b is fixedly fitted in a corresponding one of holding holes 41a formed in the main body 41 and the other end portion thereof is fixedly fitted in a corresponding one of holding holes 42a formed in the lid 42. A return spring 325 that axially urges a retainer 32 of the cam mechanism 3 (described later) is fitted onto the guide member 32b. The return spring 325 is disposed between the main body 41 and the retainer 32 in an axially compressed state. The retainer 32 is elastically pressed toward the lid 42 by the restoring force of the return spring 325, and thus movement of the retainer 32 toward the multi-disc clutch 8 is suppressed when the multi-disc clutch 8 is disengaged.

Figure 3:
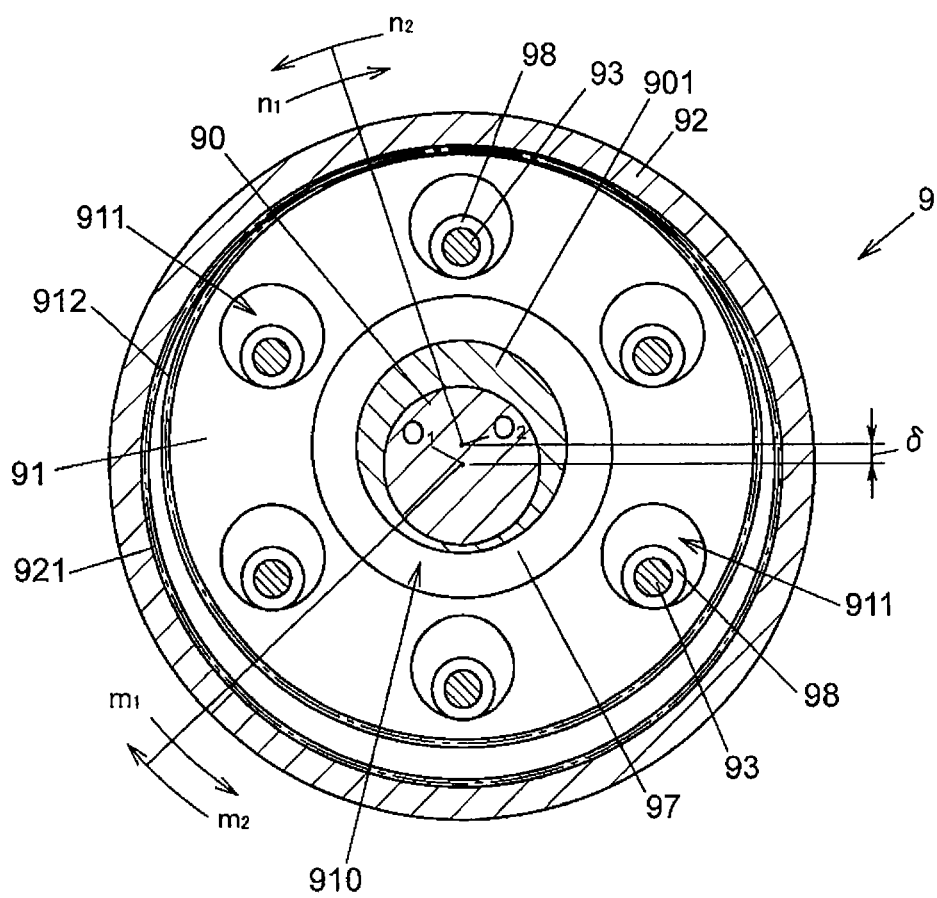
FIG. 3 is a sectional view illustrating an example of the configuration of a speed reduction mechanism.

FIG. 3 is a sectional view illustrating an example of the configuration of the speed reduction mechanism 9.

The speed reduction mechanism 9 is an eccentric oscillating speed reduction mechanism. More specifically, the speed reduction mechanism 9 is an involute speed reduction mechanism with a small difference in the number of teeth. The speed reduction mechanism 9 includes a rotary shaft 90, an input member 91, a rotation force applying member 92 and a plurality of (six in the present embodiment) output members 93. The speed reduction mechanism 9 is accommodated in a speed reduction mechanism housing 94.

The rotary shaft 90 has an eccentric portion 901 having a central axis that is an axis $O_2$, which is offset by an eccentric amount δ from the axis $O_1$ of the speed reduction mechanism 9 and which is parallel to the axis $O_1$. As illustrated in FIG. 2, the rotary shaft 90 is rotatably supported by the speed reduction mechanism housing 94 via a ball bearing 95, and is rotatably supported by the first gear 71 of the gear transmission mechanism 7 via a ball bearing 96.

The input member 91 is formed of an external gear having a center hole 910 of which the central axis coincides with an axis $O_2$. The input member 91 is rotatably supported by the rotary shaft 90 with a needle roller bearing 97 interposed between the inner periphery of the input member 91, which defines the center hole 910, and the outer periphery of the eccentric portion 901. The input member 91 makes circular motions in the direction of an arrow $n_1$ or an arrow $n_2$ with the eccentric amount δ upon reception of motor torque from the electric motor 50. The input member 91 has pin insertion holes 911 that are arranged at equal intervals around the axis $O_2$. The pin insertion holes 91b serve as a plurality of (six in the present embodiment) through-holes. External teeth 912, having an involute tooth profile and having a pitch circle that has a central axis which coincides with the axis $O_2$, are formed on the outer periphery of the input member 91.

The rotation force applying member 92 is formed of an internal gear having a central axis that coincides with an axis $O_1$. The rotation force applying member 92 is in mesh with the input member 91, and applies rotation force in the direction of an arrow $m_1$ or an arrow $m_2$ to the input member 91 that revolves upon reception of the torque from the electric motor 5. Internal teeth 921, having an involute tooth profile, are formed on the inner periphery of the rotation force applying member 92. The internal teeth 92a are in mesh with the external teeth 912 of the input member 91.

The output members 93 each are formed of a pin having a substantially uniform outside diameter. The output members 93 are passed through the pin insertion holes 911 of the input member 91, and are fitted into pin fitting holes 710 of the first gear 71 of the gear transmission mechanism 7. The output members 93 receive rotation force, applied by the rotation force applying member 92, from the input member 91 and then output the rotation force to the first gear 71 of the gear transmission mechanism 7. A needle roller bearing 98 is fitted to the outer periphery of each of the output members 93. The needle roller bearing 98 is used to reduce contact resistance between each output member 93 and the inner periphery of the input member 91, which defines the corresponding pin insertion hole 911.

Figure 4:
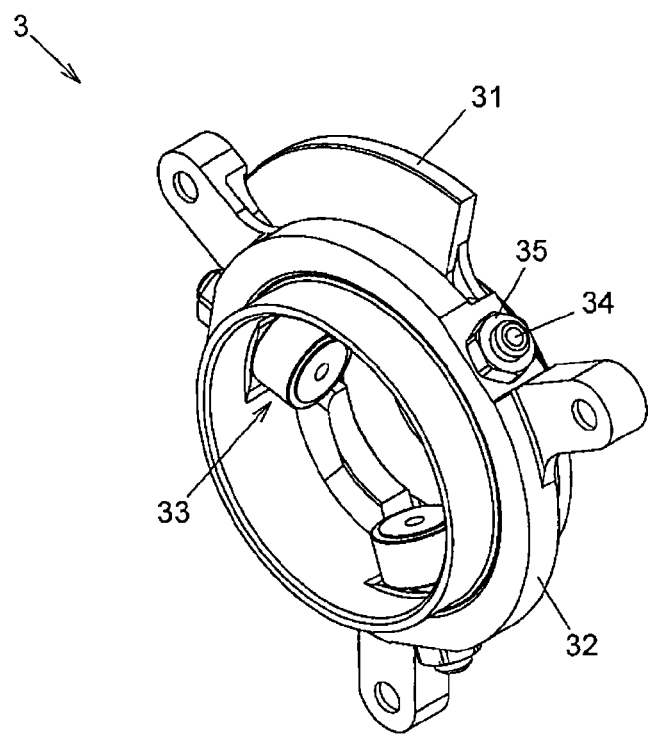
FIG. 4 is a perspective view illustrating an example of the configuration of a cam mechanism.
Figure 5:
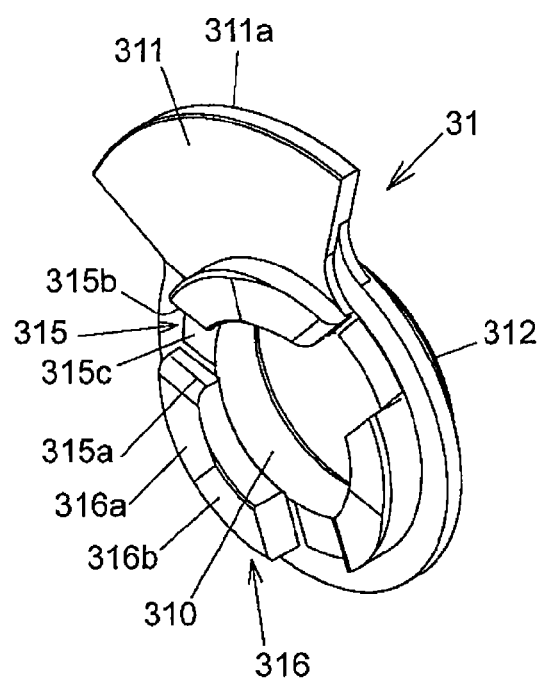
FIG. 5 is a perspective view illustrating a cam member of the cam mechanism.
Figure 6:
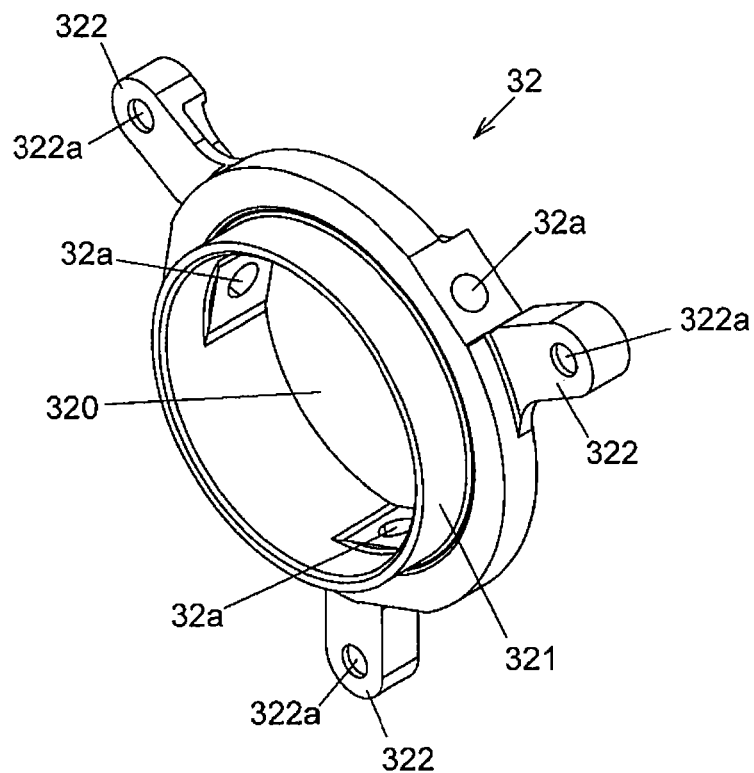
FIG. 6 is a perspective view illustrating a retainer of the cam mechanism.
Figure 7:
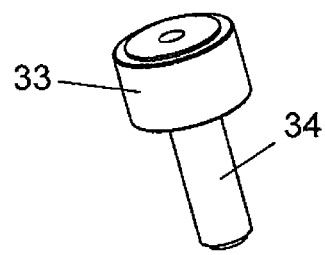
FIG. 7 is a perspective view illustrating a rolling member and a support pin of the cam mechanism.
Figure 8:
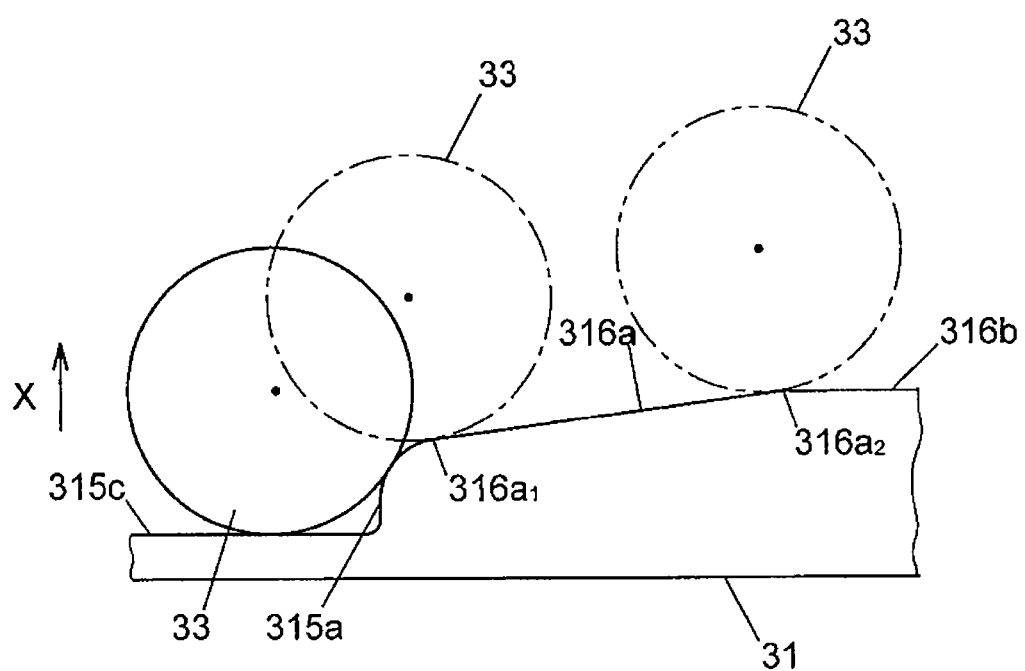
FIG. 8 is an explanatory diagram illustrating an operation of the cam mechanism.

Next, the cam mechanism 3 will be described in detail with reference to FIG. 4 to FIG. 8. FIG. 4 is a perspective view illustrating an example of the configuration of the cam mechanism 3. FIG. 5 is a perspective view illustrating a cam member 31 of the cam mechanism 3. FIG. 6 is a perspective view illustrating the retainer 32 of the cam mechanism 3. FIG. 7 is a perspective view illustrating a rolling member 33 and a support pin 34 of the cam mechanism 3. FIG. 8 is an explanatory diagram illustrating an operation of the cam mechanism 3.

The cam mechanism 3 receives the torque generated by the electric motor 5 (torque transmitted from the speed reduction mechanism 9), and generates thrust force with which the multi-disc clutch 8 is pressed in the direction of the rotation axis O. In other words, the cam mechanism 3 converts the torque generated by the electric motor 5 into a thrust force that presses the multi-disc clutch 8.

The cam mechanism 3 includes the cam member 31, the rolling members 33 and the retainer 32. The cam member 31 rotates upon reception of the torque generated by the electric motor 5. Each rolling member 33 rolls on a cam face formed in the cam member 31. The retainer 32 is an output member that outputs the thrust force generated by the rolling of the rolling member 33 toward the multi-disc clutch 8. The cam mechanism 3 is disposed radially outward of the cylindrical portion 142 of the output rotary member 14.

As illustrated in FIG. 5, the cam member 31 has an annular shape, and has an insertion hole 310 through which the output rotary member 14 is passed. A generally sector-shaped protruding piece 311 that protrudes radially outward is formed on a portion of the outer periphery of the cam member 31. The protruding piece 311 has a gear portion 311a that meshes with the second gear 72 (gear portion 720) of the gear transmission mechanism 7. The gear portion 720 of the second gear 72 and the gear portion 311a of the cam member 31 are each formed of a spur gear, and the cam member 31 is movable relative to the second gear 72 along the direction of rotation axis O.

A cylindrical portion 312 is formed on the axial one-side end face of the cam member 31. The cylindrical portion 312 protrudes from the opening periphery of the insertion hole 310 toward the rear wheel 105R (refer to FIG. 1). Protrusions 316 and recesses 315 that forms the cam face opposed to the multi-disc clutch 8 are formed on the axial other-side end face of the cam member 31. A needle roller bearing 313 (refer to FIG. 2) is interposed between the inner peripheral face of the cylindrical portion 312 and the outer peripheral face of the cylindrical portion 142 of the output rotary member 14. A needle thrust roller bearing 37 (refer to FIG. 2) is interposed between the axial one-side end face of the cam member 31 and the inner face of the lid 42 of the housing 4.

The recesses 315 and the protrusions 316 are arranged alternately in the circumferential direction of the cam member 31. In the present embodiment, three recesses 315 and three protrusions 316 are arranged adjacent to one another. Each of the recesses 315 is formed of a cutout having a substantially rectangular cross section. The cutout is defined by a pair of cutout side faces 315a, 315b and a cutout bottom face 315c. The cutout side faces 315a, 315b have a substantially uniform cutout width. The cutout bottom face 315c is located between the cutout side faces 315a, 315b.

Each of the protrusions 316 has a tilted face 316a and a flat face 316b. The tilted face 316a is tilted along the circumferential direction of the cam member 31. The tilted face 316a is tilted so that the axial thickness of the cam member 31 is gradually increased from the recess 315 side to the flat face 316b. The flat face 316b is formed to as a flat face at which the axial thickness of the cam member 31 is substantially uniform.

As illustrated in FIG. 6, the retainer 32 has an annular shape and has an insertion hole 320 through which the output rotary member 14 is passed. The rotation of the retainer 32 is restricted by a plurality of (three in the present embodiment) the guide members 32b (refer to FIG. 2). The guide members 32b are arranged between and fixedly fitted to the main body 41 and the lid 42 of the housing 4, and are parallel to the rotation axis O.

A cylindrical portion 321 is formed on the multi-disc clutch 8-side end face of the retainer 32. The cylindrical portion 31 protrudes from the opening periphery of the insertion hole 320 toward the multi-disc clutch 8. An annular pressing member 323 (refer to FIG. 2) is disposed radially outward of the cylindrical portion 321. The pressing member 323 presses the multi-disc clutch 8 upon reception of the thrust force from the retainer 32. The pressing member 323 is connected to a spline-fitting portion 132b of the cylindrical portion 132 of the input rotary member 13 by spline-fitting. A needle roller bearing 324 is interposed between the one-side end face of the pressing member 323 and the multi-disc clutch 8-side end face of the retainer 32.

Multiple (three in the present embodiment) protruding pieces 322 are formed on the outer peripheral edge of the retainer 32. The protruding pieces 322 protrude in the radial direction of the retainer 32. The protruding pieces 322 are arranged at equal intervals in the circumferential direction of the retainer 32. Each of the protruding pieces 322 has a guide insertion hole 322a through which the corresponding guide member 32b is passed. Multiple (three in the present embodiment) pin insertion holes 32a through which the support pins 34 illustrated in FIG. 7 are passed are formed in the outer peripheral edge of the retainer 32 so as to extend in the radial direction.

As illustrated in FIG. 4, each support pin 34 is attached to the retainer 32 with a nut 35. As illustrated in FIG. 7, the rolling member 33 is disposed on the outer periphery of the support pin 34. The rolling member 33 is supported so as to be rotatable relative to the support pin 34 via a needle roller 36 (refer to FIG. 2).

As illustrated in FIG. 8, if the recess 315-side end portion of the tilted face 316a, out of the both end portions of the tilted face 316a in the circumferential direction of the cam member 31, is defined as a starting end portion $316a_1$, the cam mechanism 3 outputs a first cam thrust force $P_1$ (refer to FIG. 2) in a direction parallel to the rotation axis O from the retainer 32, in a state where each rolling member 33 is located at the corresponding starting end portion $316a_1$.

If the end portion of the tilted face 316a, which is on the opposite side of the tilted face 316a from the starting end portion $316a_1$, that is, the flat face 316b-side end portion of the tilted face 316a, is defined as a terminal end portion $316a_2$, the cam mechanism 3 outputs a second cam thrust force $P_2$ (refer to FIG. 2) that is larger than the first cam thrust force $P_1$ from the retainer 32 in a state where each rolling member 33 is located between the starting end portion $316a_1$ and the terminal end portion $316a_2$. At this time, the cam member 31 transmits a first reaction force $F_1$ and a second reaction force $F_2$ (refer to FIG. 2) that are generated by reaction of the first cam thrust force $P_1$ and the second cam thrust force $P_2$, to the diaphragm 63 via the spring member 64 (described later).

Figure 9:
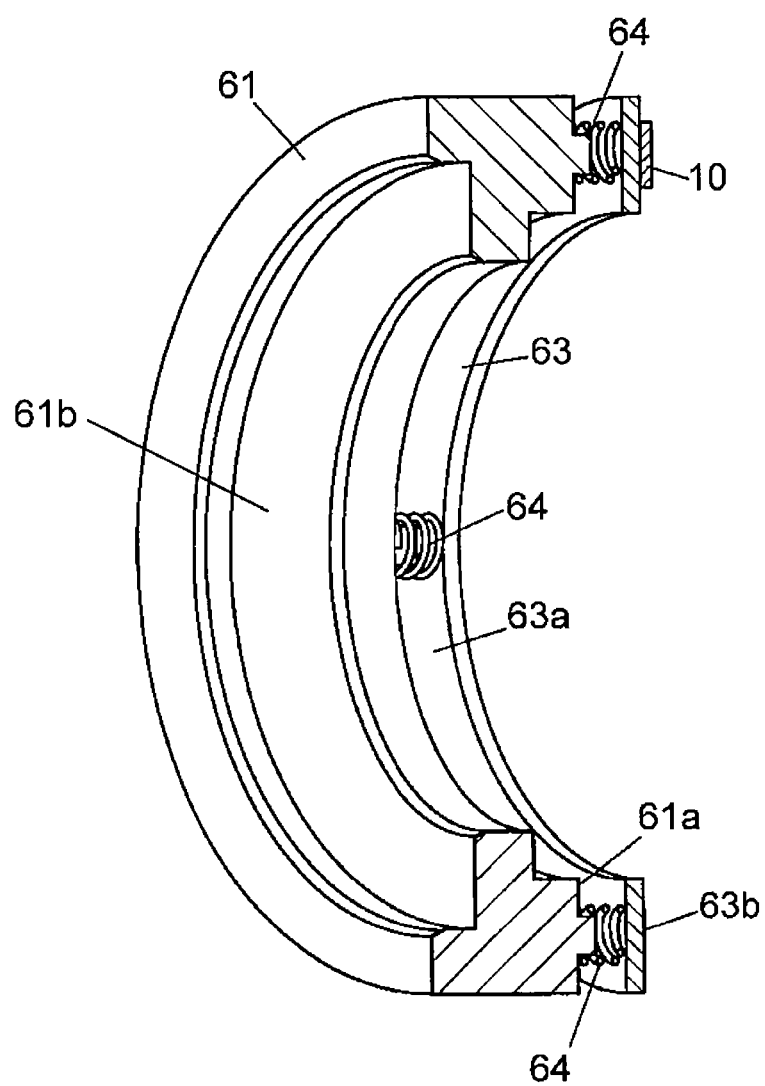
FIG. 9 is a perspective sectional view illustrating a piston, a diaphragm, a shock-absorbing member and a strain sensor.
Figure 10:
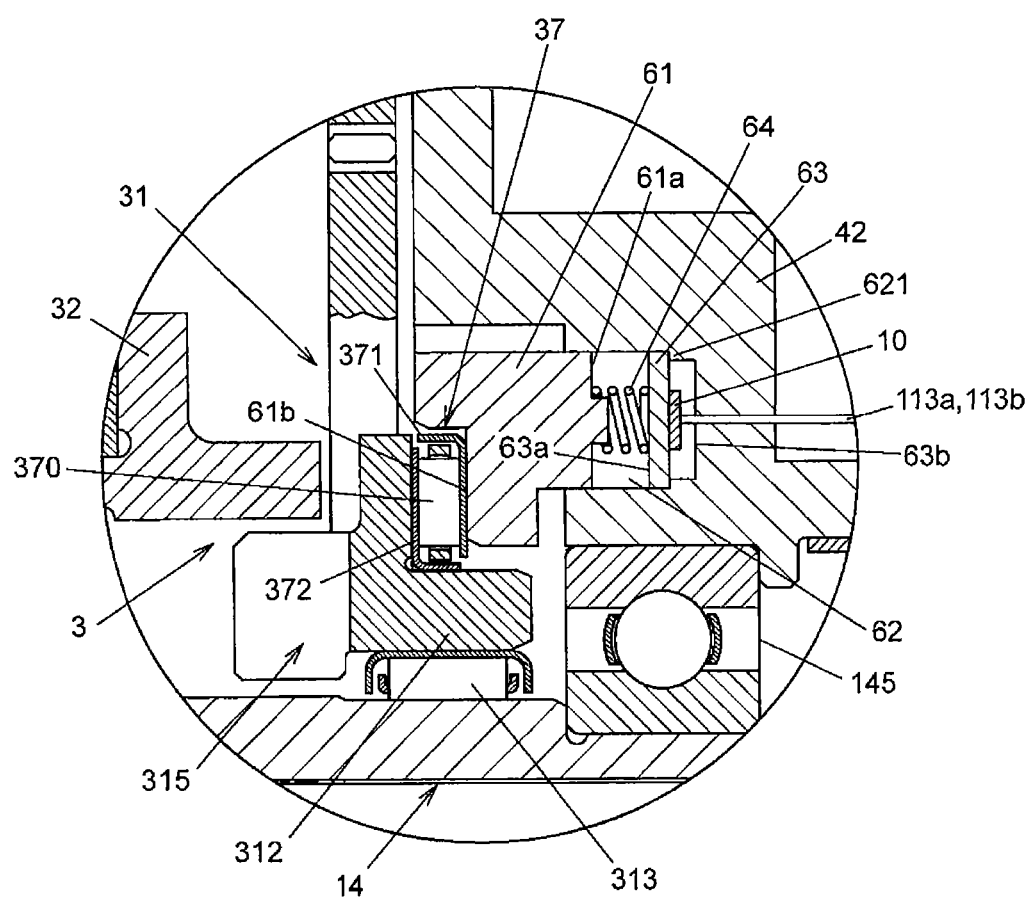
FIG. 10 is an enlarged sectional view illustrating a buffer, a detector and their surroundings.

FIG. 9 is a perspective sectional view illustrating the piston 61, the diaphragm 63, the spring member 64 and the strain sensor 10. FIG. 10 is an enlarged sectional view illustrating the buffer, the detector and their surroundings.

The piston 61 receives the first reaction force $F_1$ and the second reaction force $F_2$ that are generated by the cam mechanism 3, presses the diaphragm 63 via the spring member 64, and elastically deforms the diaphragm 63. The deformation amount (strain amount) of the diaphragm 63 is detected by the strain sensor 10 (described later) attached to the diaphragm 63.

One end face of the piston 61 in a direction parallel to the rotation axis O is formed as a pressing face 61a that comes into contact with the spring member 64 to press the spring member 64. The needle thrust roller bearing 37 is interposed between the piston 61 and the cam member 31. The needle thrust roller bearing 37 includes an outer race 371, an inner race 372 and rollers 370. The rollers 370 are arranged between the outer race 371 and the inner race 372. A bearing contact face 61b that comes into contact with the outer race 371 of the needle thrust roller bearing 37 is formed on the opposite side of the piston 61 from the pressing face 61a. The piston 61 has an annular shape, and the central axis of the piston 61 coincides with the rotation axis O.

The diaphragm 63 is formed of an annular metal plate, and is accommodated in the accommodation portion 62 formed, as an annular recessed portion, in the lid 42 of the housing 4 as illustrated in FIG. 10. The accommodation portion 62 opens toward the cam member 31. An outer step portion 621 and an inner step portion 622 are formed at a deep part of the accommodation portion 62. The diaphragm 63 is engaged at its outer periphery with the outer step portion 621 and is engaged at its inner periphery with the inner step portion 622. A first flat face 63a of the diaphragm 63 in the direction parallel to the rotation axis O is pressed by the spring member 64, and the strain sensor 10 is attached to a second flat face 63b formed on the opposite side of the diaphragm 63 from the first flat face 63a. As the first flat face 63a is pressed by the pressing face 61a via the spring member 64, the diaphragm 63 is elastically deformed so as to be bent in the direction parallel to the rotation axis O.

The spring member 64 is attached at one end to the pressing face 61a of the piston 61, and is attached at the other end to the first flat face 63a of the diaphragm 63. For example, the spring member 64 buffers an impact applied from the cam mechanism 3 to the diaphragm 63 when the electric motor 5 (refer to FIG. 2) is rapidly rotated upon actuation of the driving force transmission apparatus 11.

Figure 11A:
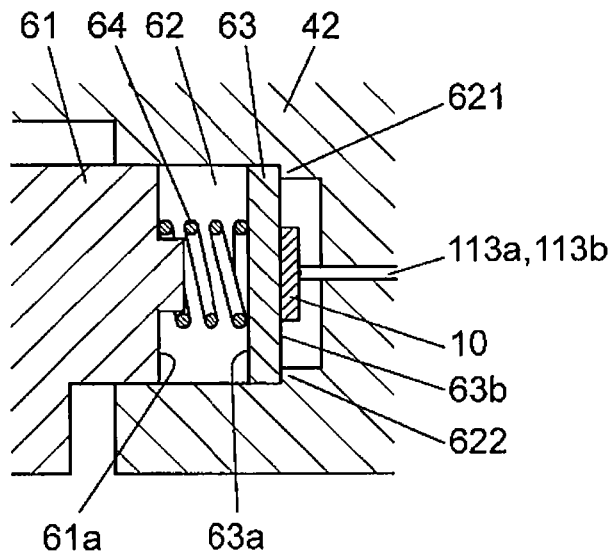
FIG. 11A is an enlarged view of the strain sensor and its surroundings in FIG. 10, illustrating the state before a reaction force is applied from the cam mechanism.
Figure 11B:
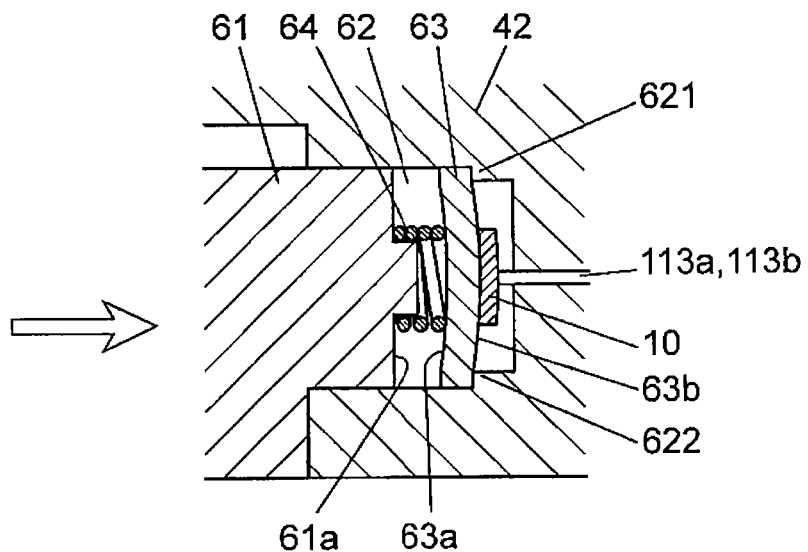
FIG. 11B is an enlarged view of the strain sensor and its surroundings in FIG. 10, illustrating the state after the reaction force is applied from the cam mechanism.
Figure 12:
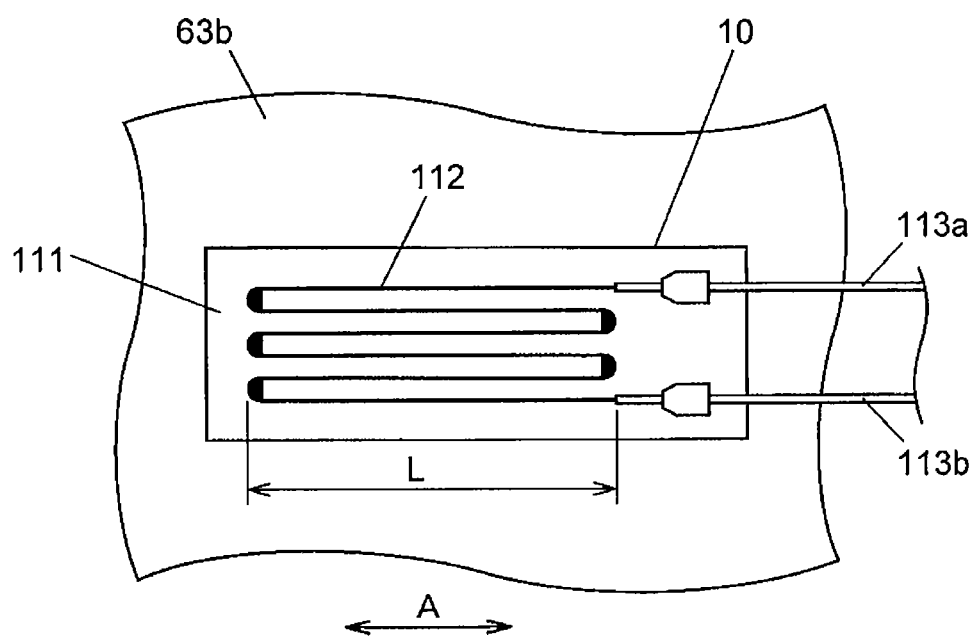
FIG. 12 is a plan view illustrating an example of the configuration of the strain sensor.

FIG. 11A and FIG. 11B are each an enlarged view of the strain sensor 10 and its surroundings in FIG. 10. FIG. 11A illustrates the state before a reaction force is applied from the cam mechanism 3. FIG. 11B illustrates the state after the reaction force is applied from the cam mechanism 3. FIG. 12 is a plan view illustrating an example of the configuration of the strain sensor 10.

The strain sensor 10 is disposed on the second flat face 63b of the diaphragm 63, at a position on the opposite side of the diaphragm 63 from a portion with which the spring member 64 comes into contact. As illustrated in FIG. 12, the strain sensor 10 includes a base 111 made of, for example, an insulating material such as resin, a resistance wire 112 made of a metal foil, and leads 113a, 113b that are extended from respective ends of the resistance wire 112. The resistance wire 112 is routed so as to meander on the base 111. In the present embodiment, the resistance wire 112 is folded five times in the radial direction of the diaphragm 63. The length of the folded resistance wire 112 in the radial direction of the diaphragm 63 (direction of an arrow A in FIG. 12) is defined as a gauge length L.

When the piston 61 receives the first reaction force $F_1$ and the second reaction force $F_2$ from the cam member 31 and is shifted from the state (initial state) illustrated in FIG. 11A to the state illustrated in FIG. 11B, the respective end portions of the second flat face 63b are pressed against the outer step portion 621 and the inner step portion 622 of the accommodation portion 62 and thus the diaphragm 63 is elastically deformed (bent) in the direction parallel to the rotation axis O. The resistance wire 112 of the strain sensor 10 attached to the second flat face 63b is pulled in the radial direction of the diaphragm 63 so that the gauge length L is extended (increased) and the sectional area of the resistance wire 112 is decreased. This increases the resistance value of the resistance wire 112.

When the piston 61 no longer receives the first reaction force $F_1$ and the second reaction force $F_2$ from the cam member 31, that is, when the piston 61 is shifted from the state illustrated in FIG. 11B to the state illustrated in FIG. 11A, the resistance value of the resistance wire 112 returns to the resistance value in the initial state.

The controller 12 (refer to FIG. 1) detects the deformation amount (strain amount) of the diaphragm 63 based on a change in the resistance value caused by a change in the gauge length L. Then, the controller 12 computes the cam thrust force generated by the cam mechanism 3 based on a signal from the strain sensor 10, and controls the electric motor 5 (refer to FIG. 2) based on the computed cam thrust force. A concrete example of a process executed when the controller 12 controls the electric motor 5 will be described later.

Next, the operation of the driving force transmission apparatus 11 in the present embodiment will be described with reference to FIG. 1, FIG. 2, FIG. 8 and FIG. 11.

In order to connect the propeller shaft 20 to the axle shaft 25R with the use of the driving force transmission apparatus 11, current is supplied from the controller 12 to the electric motor 5, and the torque generated by the electric motor 5 is applied to the cam mechanism 3 to actuate the cam mechanism 3. At this time, the cam member 31 of the cam mechanism 3 is rotated in one direction around the rotation axis O. As illustrated in FIG. 8, when the cam member 31 is rotated, each rolling member 33 starts rolling from the state (initial state) where the rolling member 33 is located in the corresponding recess 315 of the cam member 31, runs onto the tilted face 316a of the corresponding protrusion 316 of the cam member 31, and is then located at the starting end portion $316a_1$. Thus, the torque generated by the electric motor 5 is converted into the first cam thrust force $P_1$ for reducing the gaps between the outer clutch plates 81 and the inner clutch plates 82 of the multi-disc clutch 8. The reaction of the first cam thrust force $P_1$ generates the first reaction force $F_1$ which presses the piston 61.

The rolling members 33 press the retainer 32 toward the multi-disc clutch 8 (in the direction of an arrow X in FIG. 2 and FIG. 8) via the support pins 34 and the needle rollers 36. The retainer 32 presses the pressing member 323 in such a direction that the outer clutch plates 81 and the inner clutch plates 82 of the multi-disc clutch 8 approach each other. As the pressing member 323 presses the outer clutch plates 81 and the inner clutch plates 82 in the direction of the arrow X, the gaps between the outer clutch plates 81 and the inner clutch plates 82 which are adjacent to each other are reduced.

The cam member 31 is pressed toward the piston 61 (in a direction opposite to the direction of the arrow X) via the needle thrust roller bearing 37. Thus, the piston 61 is pressed toward the diaphragm 63, and the diaphragm 63 is elastically deformed so as to bulge toward the deep part of the accommodation portion 62.

As the cam member 31 receives the torque generated by the electric motor 5 and is further rotated in the one direction around the rotation axis O, each rolling member 33 rolls on the tilted face 316a of the protrusion 316 toward the flat face 316b, reaches the terminal end portion $316a_2$ of the tilted face 316a, and runs onto the flat face 316b. Thus, the torque generated by the electric motor 5 is converted into the second cam thrust force $P_2$ for frictionally engaging the outer clutch plates 81 and the inner clutch plates 82 of the multi-disc clutch 8 with each other. The reaction of the second cam thrust force $P_2$ generates the second reaction force $F_2$ that presses the piston 61.

The pressing member 323 to which the second cam thrust force $P_2$ is applied from the rolling member 33 presses the outer clutch plates 81 and the inner clutch plates 82 in the direction of the arrow X. As a result, the outer clutch plates 81 and the inner clutch plates 82 of the multi-disc clutch 8 that are adjacent to each other are frictionally engaged with each other.

The cam member 31 is further pressed toward the piston 61 (in a direction opposite to the direction of the arrow X) by the second reaction force $F_2$. Thus, the piston 61 is further pressed toward the diaphragm 63, and the diaphragm 63 is elastically deformed so as to further bulge toward the deep part of the accommodation portion 62.

The deformation amount of the diaphragm 63 is detected as a change in the resistance value caused by a change in the gauge length L of the resistance wire 112 of the strain sensor 10. The strain sensor 10 outputs a signal indicating a change in the detected strain amount to the controller 12 (refer to FIG. 1). The controller 12 computes the cam thrust force (the first cam thrust force $P_1$ and the second cam thrust force $P_2$) generated by the cam mechanism 3 based on the signal output from the strain sensor 10, and controls the current that is supplied to the electric motor 5 based on the computed cam thrust force.

As described above, the driving force (torque) generated by the engine 102 is transmitted from the input rotary member 13 to the output rotary member 14, and is then transmitted from the output rotary member 14 to the rear wheel 105R via the axle shaft 25R. As a result, the rear wheel 105R is driven to be rotated. As the rear wheel 105R is driven to be rotated, the driving force is transmitted also to the rear wheel 105L which is paired with the rear wheel 105R. As a result, the four-wheel-drive vehicle 100 is placed in the four-wheel-drive mode. That is, in the four-wheel-drive vehicle 100, the driving force generated by the engine 102 is allowed to be transmitted to the rear wheel-side driving force transmission system 101B by the driving force transmission apparatus 11, and the amount of driving force that is transmitted is controlled by the controller 12.

Figure 13:
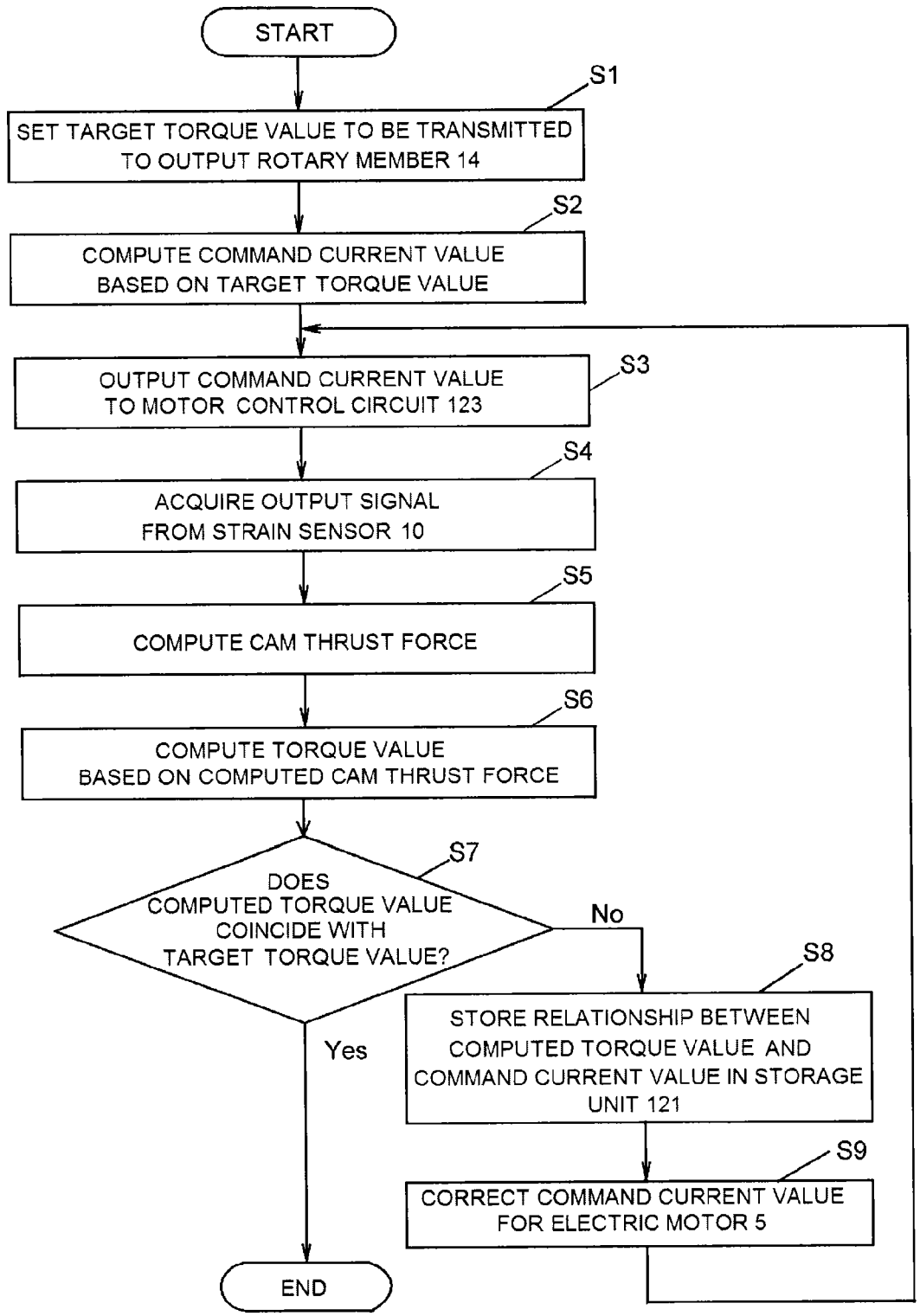
FIG. 13 is a flowchart illustrating a concrete example of a process executed by a control unit of the controller.
Figure 14:
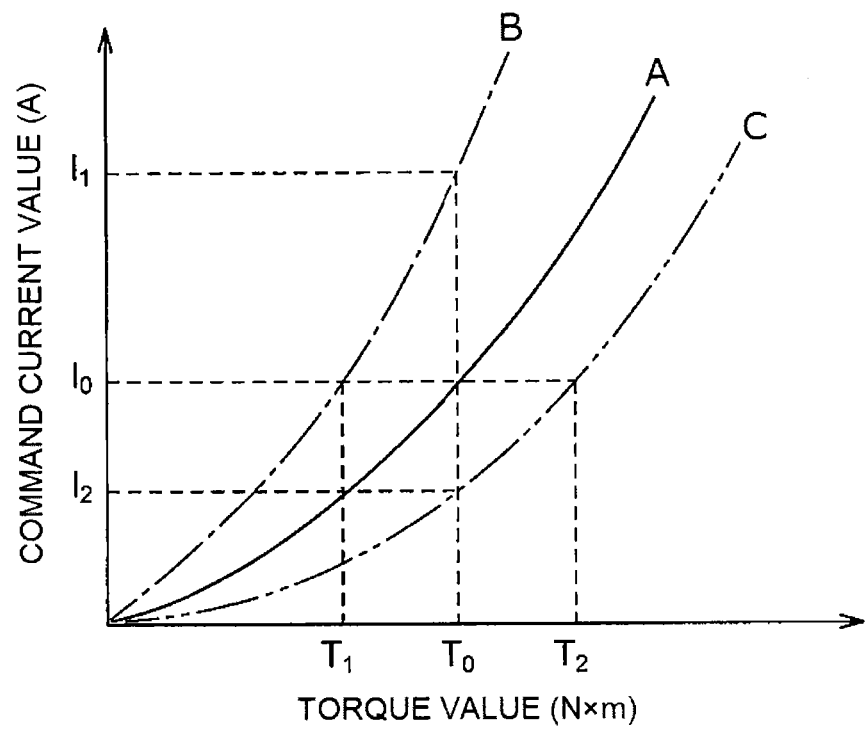
FIG. 14 is a graph illustrating a map that defines the relationship between a target torque value, which is a value of the torque that should be transmitted to an output rotary member, and a command current value for an electric motor.

FIG. 13 is a flowchart illustrating a concrete example of a process executed by the control unit 122 of the controller 12. The control unit 122 repeatedly executes the process illustrated in the flowchart with a control period (for example, 10 ms). FIG. 14 is a graph illustrating a map that defines the relationship between a target torque value, which is a value of the torque that should be transmitted to an output rotary member 14, and a command current value for the electric motor 5.

The control unit 122 sets a target torque value, which is a value of the torque that should be transmitted from the input rotary member 13 to the output rotary member 14, based on the vehicle travelling state (step S1). The vehicle travelling state includes, for example, the difference in rotational speed between the front wheels 104R, 104L and the rear wheels 105R, 105L and the vehicle speed. Then, the control unit 122 computes a current value, which is a value of the current that should be supplied to the electric motor 5, as a command current value based on the target torque value (step S2). Then, the control unit 122 outputs the command current value to the motor control circuit 123 (step S3).

When the current corresponding to the command current value is supplied to the electric motor 5 by the motor control circuit 123, the torque generated by the electric motor 5 is transmitted to the cam mechanism 3 via the speed reduction mechanism 9, and the reaction force against the cam thrust force generated by the cam mechanism 3 is converted into the deformation amount of the diaphragm 63. The control unit 122 acquires an output signal from the strain sensor 10 that has detected the deformation amount of the diaphragm 63 (step S4). Based on the output signal, the control unit 122 computes a cam thrust force that is actually generated by the cam mechanism 3 (step S5). Then, based on the computed cam thrust force, the control unit 122 computes a torque value, which is a value of the torque actually transmitted from the input rotary member 13 to the output rotary member 14 (step S6).

When the computed torque value coincides with the target torque value (YES in S7), the control unit 122 ends the process in the flowchart illustrated in FIG. 13. On the other hand, when the computed torque value differs from the target torque value (NO in S7), the control unit 122 causes the storage unit 121 to store the relationship between the computed torque value and the command current value for the electric motor 5 (step S8), corrects the command current value for the electric motor 5 such that the actual torque value coincides with the target torque value (step S9), and outputs the corrected command current value to the motor control circuit 123 (step S3). Thus, based on the corrected command current value, current is supplied to the electric motor 5 by the motor control circuit 123.

The process executed by the control unit 122 in step S8 and step S9 will be described in more detail with reference to FIG. 14. A curve A in FIG. 14 is a characteristic curve based on the map that defines the relationship between the target torque value set in step S1 and the command current value output for the electric motor 5, which is computed based on the target torque value in step S2. For example, when the target torque value is $T_0$, the command current value is $I_0$.

When current corresponding to the command current value $I_0$ is supplied to the electric motor 5 through the process in step S3, if the actual torque value computed in step S6 is smaller than a target torque value $T_0$ (for example $T_1$), the map is corrected as illustrated by a curve B in FIG. 14. Thus, the command current value (for example, $I_1$) that is greater than the target torque value $T_0$ is computed.

When the command current value $I_0$ is supplied to the electric motor 5 through the process in step S3, if the actual torque value computed in step S6 is greater than the target torque value $T_0$ (for example $T_2$), the map is corrected as illustrated by a curve C in FIG. 14. Thus, the command current value (for example, $I_2$) that is smaller than the target torque value $T_0$ is computed.

In step S9, the command current value $I_0$ for the electric motor 5 is corrected to the command current value $I_1$ or the command current value $I_2$. That is, when correcting the command current value for the electric motor 5 in step S9, the control unit 122 corrects, based on the cam thrust force computed in step S5, the map that defines the relationship between the driving force that should be transmitted from the input rotary member 13 to the output rotary member 14 (the target torque value, which is the value of torque that should be transmitted from the input rotary member 13 to the output rotary member 14) and the command current value for the electric motor 5.

According to the first embodiment described above, the following operations and advantageous effects are obtained.

(1) The strain sensor 10 detects the reaction force against the cam thrust force generated by the cam mechanism 3 as the deformation amount of the diaphragm 63. Therefore, it is possible to accurately adjust the cam thrust force. That is, based on the signal from the strain sensor 10, the controller 12 computes the cam thrust force actually generated by the cam mechanism 3. Based on the computed cam thrust force, the controller 12 accurately controls the electric motor 5. Therefore, it is possible to bring the pressing force with which the multi-disc clutch 8 is pressed by the cam mechanism 3, closer to a desired value.

(2) The spring member 64 is interposed between the cam mechanism 3 (piston 61) and the diaphragm 63. Therefore, even if an impact is applied from the cam mechanism 3 to the diaphragm 63 due to, for example, sudden rotation of the electric motor 5, the spring member 64 absorbs the impact. Thus, it is possible to reduce damage to the strain sensor 10 attached to the diaphragm 63.

(3) Based on the cam thrust force computed in step S5, the control unit 122 of the controller 12 corrects the map that defines the relationship between the driving force that should be transmitted from the input rotary member 13 to the output rotary member 14 and the command current value for the electric motor 5, and suppresses a delay in a subsequent response by storing the corrected map.

Next, a second embodiment of the invention will be described with reference to FIG. 15.

In the second embodiment, the components having substantially the same functions as those in the first embodiment will be denoted by the same reference symbols and names as those in the first embodiment, and description thereof will be omitted.

Figure 15:
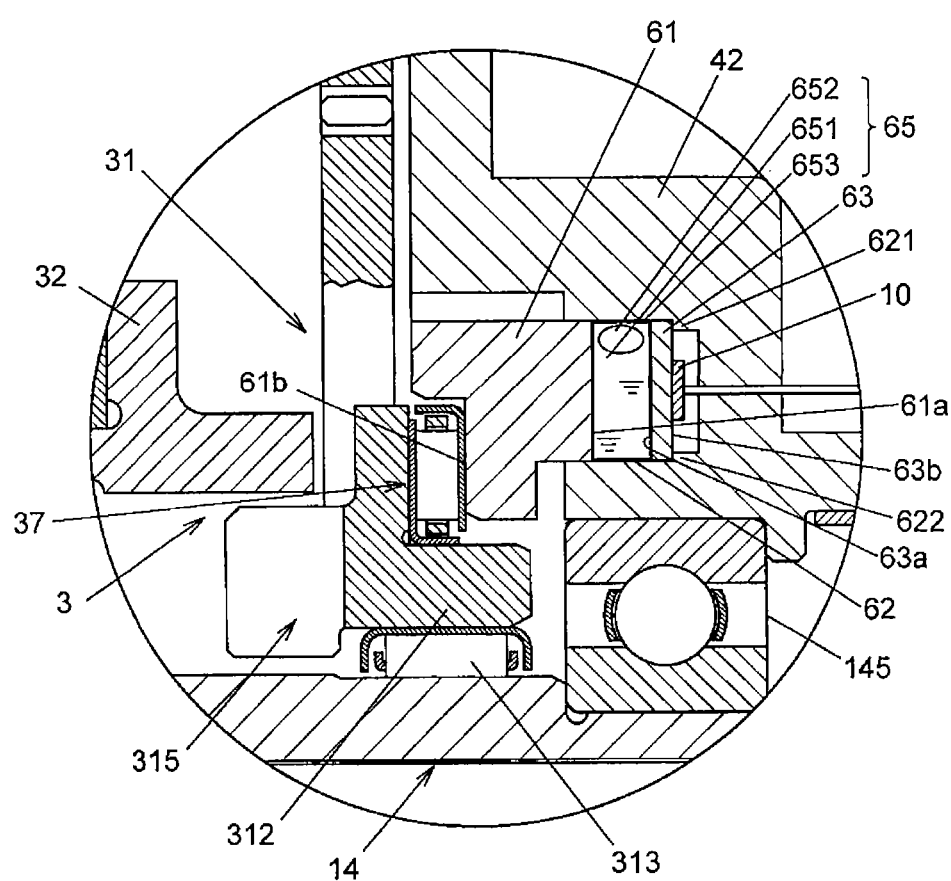
FIG. 15 is an enlarged sectional view illustrating a buffer, a detector and their surroundings in a driving force transmission apparatus according to a second embodiment of the invention.

FIG. 15 is an enlarged sectional view illustrating a buffer, a detector and their surroundings in a driving force transmission apparatus 11 according to the second embodiment of the invention.

In the driving force transmission apparatus 11 according to the present embodiment, the configuration of a buffer member 65 differs from the configuration of the spring member 64 in the driving force transmission apparatus 11 according to the first embodiment.

The buffer member 65 is formed by filling a rubber film 653 with a compressible liquid 651 together with air bubbles 652. If the rubber film 653 is sufficiently thick, the rubber film 653 of the buffer member 65 may be filled with only the air bubbles 652. That is, the rubber film 653 may be filled with only air. The buffer member 65 is accommodated in the accommodation portion 62 formed in the lid 42 of the housing 4, and is interposed between the piston 61 and the diaphragm 63.

As the piston 61 receives the first reaction force $F_1$ and the second reaction force $F_2$ from the cam member 31, the pressing face 61a of the piston 61 presses the buffer member 65 (rubber film 653). As the buffer member 65 (liquid 651) is pressed by the piston 61, the air bubbles 652 are compressed. The buffer member 65 presses the first flat face 63a of the diaphragm 63. Thus, the outer periphery of the diaphragm 63 is pressed against the outer step portion 621 and the inner periphery of the diaphragm 63 is pressed against the inner step portion 622. Then, the diaphragm 63 is elastically deformed by being bent in the direction parallel to the rotation axis O.

As in the first embodiment, the strain sensor 10 attached to the second flat face 63b of the diaphragm 63 detects the deformation amount (strain amount) of the diaphragm 63 as an amount of change in the resistance value caused by a change in the gauge length L of the resistance wire 112 (refer to FIG. 12).

According to the present embodiment, the operations and advantageous effects similar to the operations and advantageous effects (1) to (3) in the first embodiment are obtained.

Next, a third embodiment of the invention will be described with reference to FIG. 16.

In the third embodiment, the components having substantially the same functions as those in the first and second embodiments will be denoted by the same reference symbols and names as those in the first and second embodiments, and description thereof will be omitted.

Figure 16:
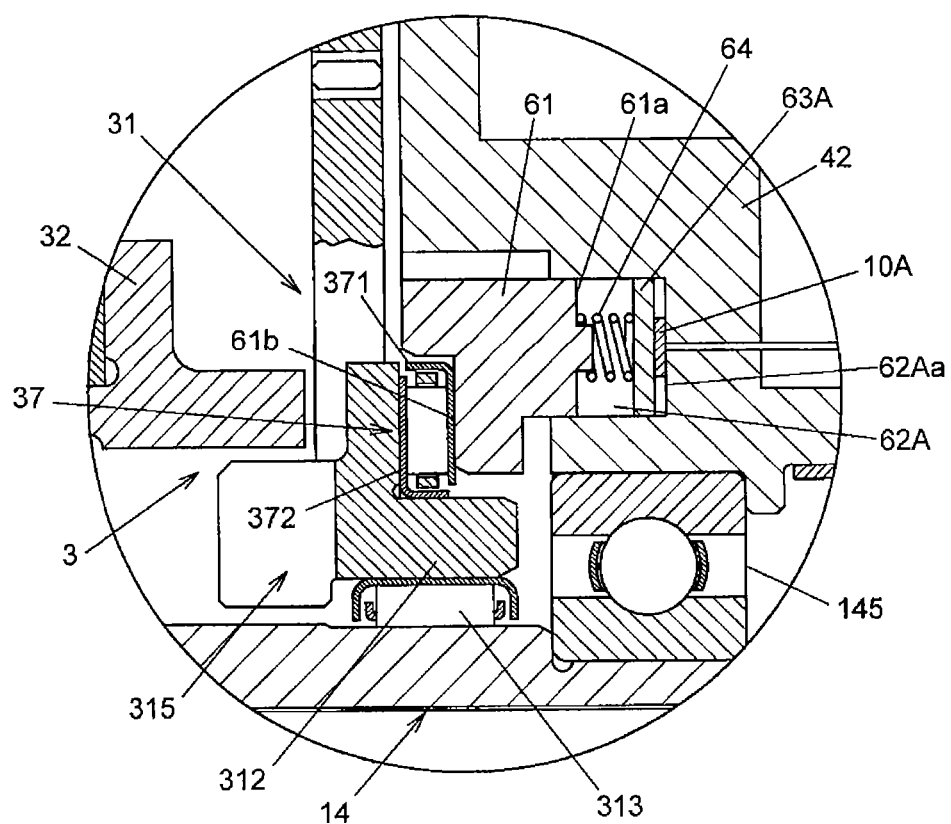
FIG. 16 is an enlarged sectional view illustrating a buffer, a detector and their surroundings in a driving force transmission apparatus according to a third embodiment of the invention.

FIG. 16 is an enlarged sectional view illustrating a buffer, a detector and their surroundings in a driving force transmission apparatus 11 according to the third embodiment of the invention.

In the driving force transmission apparatus 11 according to the present embodiment, the configuration of a detector that detects the first reaction force $F_1$ and the second reaction force $F_2$ that are applied from the cam member 31 differs from the configuration of the detector in the driving force transmission apparatus 11 according to the first embodiment.

The detector in the present embodiment includes a piezoelectric sensor 10A and an attachment plate 63A. The piezoelectric sensor 10A converts the first reaction force $F_1$ and the second reaction force $F_2$ that are applied from the cam member 31 into voltage, and detects them in the form of voltage. The piezoelectric sensor 10A is attached to the attachment plate 63A.

The piezoelectric sensor 10A and the attachment plate 63A are accommodated in an accommodation portion 62A formed in the lid 42 of the housing 4. The accommodation portion 62A opens toward the cam member 31, and the piezoelectric sensor 10A is in contact with a bottom face 62Aa formed in the deep part of the accommodation portion 62A.

The piston 61 receives the first reaction force $F_1$ and the second reaction force $F_2$ from the cam member 31, and presses the attachment plate 63A via the spring member 64. The attachment plate 63A receives the pressing force directed toward the bottom face 62Aa of the accommodation portion 62A. The piezoelectric sensor 10A disposed on the face of the attachment plate 63A, which is on the opposite side of the attachment plate 63A from the face to which the spring member 64 is attached, is pressed against bottom face 62Aa of the accommodation portion 62A. The piezoelectric sensor 10A converts the pressing force applied from the attachment plate 63A into voltage, and outputs a change in the voltage to the controller 12.

According to the present embodiment, the operations and advantageous effects similar to the operations and advantageous effects (1) to (3) in the first embodiment are obtained.

Next, a fourth embodiment of the invention will be described with reference to FIG. 17 to FIG. 19.

In the fourth embodiment, the components having substantially the same functions as those in the first to third embodiments will be denoted by the same reference symbols and names as those in the first to third embodiments, and description thereof will be omitted.

Figure 17:
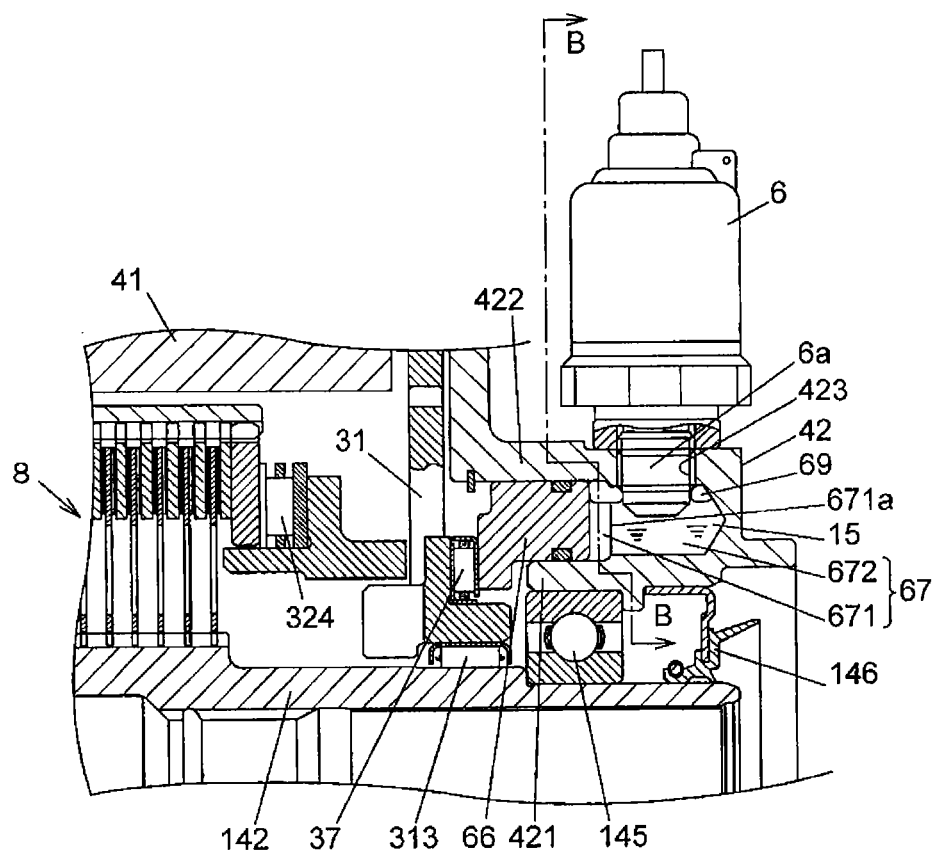
FIG. 17 is an enlarged sectional view illustrating a buffer, a detector and their surroundings in a driving force transmission apparatus according to a fourth embodiment of the invention.

FIG. 17 is an enlarged sectional view illustrating a buffer, a detector and their surroundings in a driving force transmission apparatus 11 according to the fourth embodiment of the invention. FIG. 18 is a sectional view taken along the line B-B in FIG. 17.

In the driving force transmission apparatus 11 according to the present embodiment, the configurations of a buffer and a detector differ from the configurations of the buffer and the detector in the driving force transmission apparatus 11 according to the first to third embodiments.

In the present embodiment, the detector is a pressure sensor 6 that detects a pressure of a fluid 15 that is compressed by the first reaction force $F_1$ and the second reaction force $F_2$ received from the cam mechanism 3. The buffer is formed of air bubbles 69 sealed in an accommodation portion 67 together with the fluid 15. The fluid 15 is mineral oil and sealed in the accommodation portion 67 formed in the lid 42.

The pressure sensor 6 may be, for example, a semiconductor piezoresistance diffusion pressure sensor, or a capacitance type pressure sensor. The semiconductor piezoresistance diffusion pressure sensor has a semiconductor strain gauge formed on the surface of the diaphragm, and converts a change in electrical resistance caused by a piezoresistance effect that is generated as the diaphragm is deformed by the pressure of the liquid, into an electric signal. The capacitance type pressure sensor has a capacitor formed by making the fixed pole of glass and the movable pole of silicon face each other, and converts a change in the capacitance that is generated as the movable electrode is deformed by the pressure of the liquid, into an electric signal.

Figure 18:
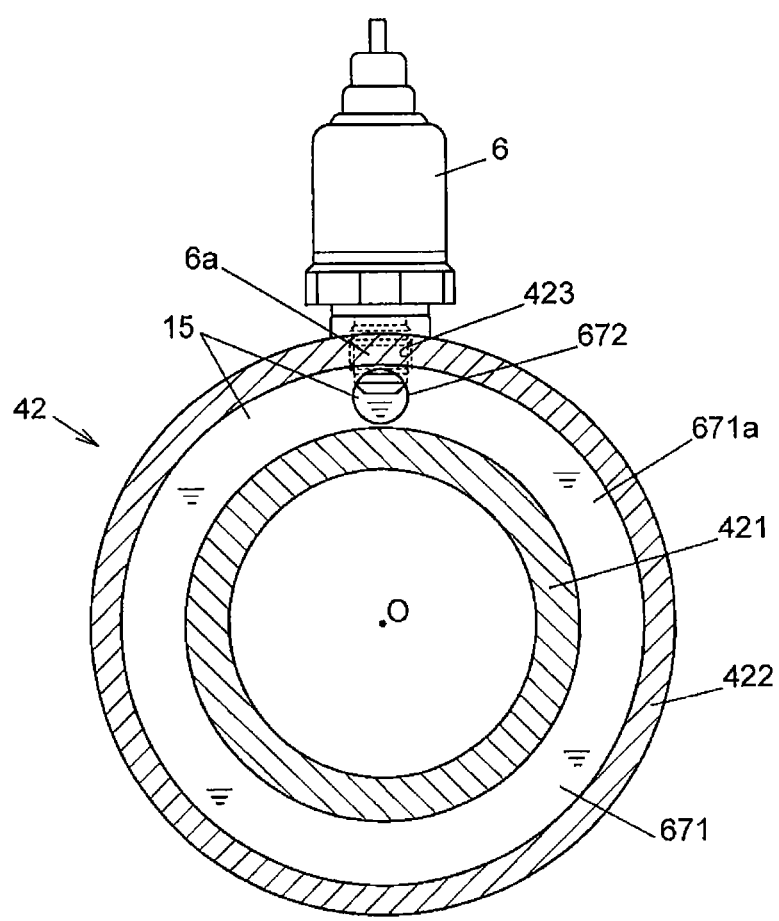
FIG. 18 is a sectional view taken along the line B-B in FIG. 17.

As illustrated in FIG. 18, the accommodation portion 67 has a first accommodation portion 671 and a second accommodation portion 672 formed between an inner wall portion 421 and an outer wall portion 422 of the lid 42. The first accommodation portion 671 is formed in an annular shape around the rotation axis O. The second accommodation portion 672 opens toward a bottom face 671a of the first accommodation portion 671, and extends in the direction parallel to the rotation axis O.

The first accommodation portion 671 is an annular groove having a depth in the direction parallel to the rotation axis O, and opens toward the cam member 31. The bottom face 671a of the first accommodation portion 671 is formed of a flat face orthogonal to the depth direction of the first accommodation portion 671. The second accommodation portion 672 opens at one position of the bottom face 671a in the circumferential direction. The second accommodation portion 672 is a round hole of which the deep part-side end portion is closed. The second accommodation portion 672 is formed by drilling, and has a tapered shape at the deep-part side.

A fitting hole 423 for fitting the pressure sensor 6 to the lid 42 is formed in the lid 42 so as to communicate with the second accommodation portion 672. In other words, the second accommodation portion 672 is formed at a position corresponding to the position at which the pressure sensor 6 is disposed. The fitting hole 423 is formed so as to be orthogonal to the second accommodation portion 672, one end opens into the second accommodation portion 672, and the other end thereof is formed as a round hole that opens to the outside of the housing 4 (lid 42). An internal thread is formed on the inner face that defines the fitting hole 423, and an external thread formed on the outer face of a cylindrical portion 6a formed at an end portion of the pressure sensor 6 is screwed to the internal thread.

Figure 19:
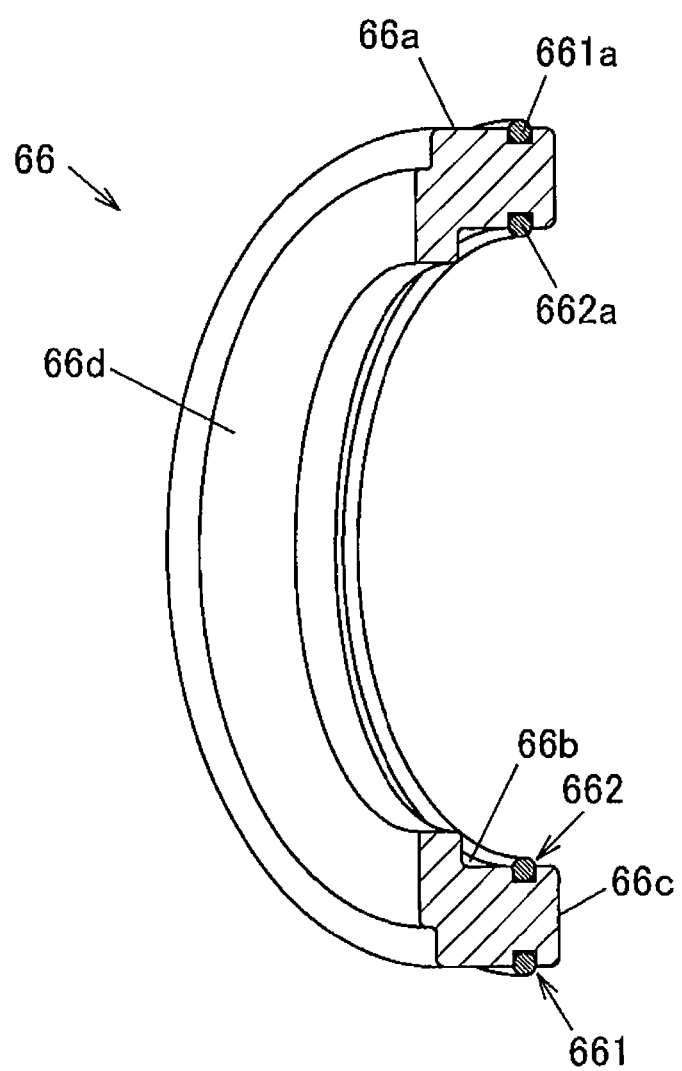
FIG. 19 is a perspective sectional view illustrating a piston according to the fourth embodiment.

FIG. 19 is a perspective sectional view illustrating a piston 66 according to the fourth embodiment.

The piston 66 is formed in an annular shape around the rotation axis O, and one axial end portion thereof is accommodated in the first accommodation portion 671 of the accommodation portion 67. An outer seal holding portion 661 that holds an outer seal member 661a that seals a gap between an outer peripheral face 66a of the piston 66 and the outer wall portion 422 is formed in the outer peripheral face 66a of the piston 66 along the entire periphery in the circumferential direction. Similarly, an inner seal holding portion 662 that holds an inner seal member 662a that seals a gap between an inner peripheral face 66b of the piston 66 and the inner wall portion 421 is formed in the inner peripheral face 66b of the piston 66 along the entire periphery in the circumferential direction.

The outer seal member 661a and the inner seal member 662a are each formed of an elastic member having a circular cross section, for example, an annular O-ring. The fluid 15 is sealed in the accommodation portion 67 by the piston 66, the outer seal member 661a and the inner seal member 662a.

The piston 66 has a fluid pressing face 66c that presses the fluid 15. The piston 66 has a bearing contact face 66d that comes into contact with the needle thrust roller bearing 37 interposed between the piston 66 and the cam member 31. The bearing contact face 66d is formed on the opposite side of the piston 66 from the fluid pressing face 66c.

When the piston 66 receives, at the bearing contact face 66d, the first reaction force $F_1$ and the second reaction force $F_2$ from the cam member 31 via the needle thrust roller bearing 37 and is pressed toward the second accommodation portion 672 along the direction parallel to the rotation axis O, the fluid pressing face 66c presses the fluid 15 and the fluid 15 in the accommodation portion 67 is compressed.

In this case, the fluid pressing face 66c of the piston 66 presses the air bubbles 69 together with the fluid 15. Thus, even if an impact is applied from the cam mechanism 3 to the fluid 15 due to, for example, sudden rotation of the electric motor 5 (refer to FIG. 2), the air bubbles 69 contained in the fluid 15 are pressed and compressed by the piston 66. As a result, the impact is absorbed. The air bubbles 69 have compressibility higher than the fluid 15, that is, upon reception of pressure, the air bubbles 69 are compressed more than the fluid 15. Therefore, when an impact is applied from the piston 66, mainly the air bubbles 69 are compressed to absorb the impact.

As the piston 66 receives the first reaction force $F_1$ and the second reaction force $F_2$ from the cam member 31, the fluid 15 is compressed and the pressure of the fluid 15 in the accommodation portion 67 is increased. On the other hand, when the piston 66 does not receive the first reaction force $F_1$ and the second reaction force $F_2$ from the cam member 31 ($F_1=0$, $F_2=0$), the fluid 15 is not compressed and therefore the pressure of the fluid 15 in the accommodation portion 67 is decreased. The pressure sensor 6 detects a change in the pressure of the fluid 15.

According to the present embodiment as well, the operations and advantageous effects similar to the operations and advantageous effects (1) to (3) in the first embodiment are obtained.

Next, a fifth embodiment of the invention will be described with reference to FIG. 20.

In the fifth embodiment, the components having substantially the same functions as those in the first to fourth embodiments will be denoted by the same reference symbols and names as those in the first to fourth embodiments, and description thereof will be omitted.

Figure 20:
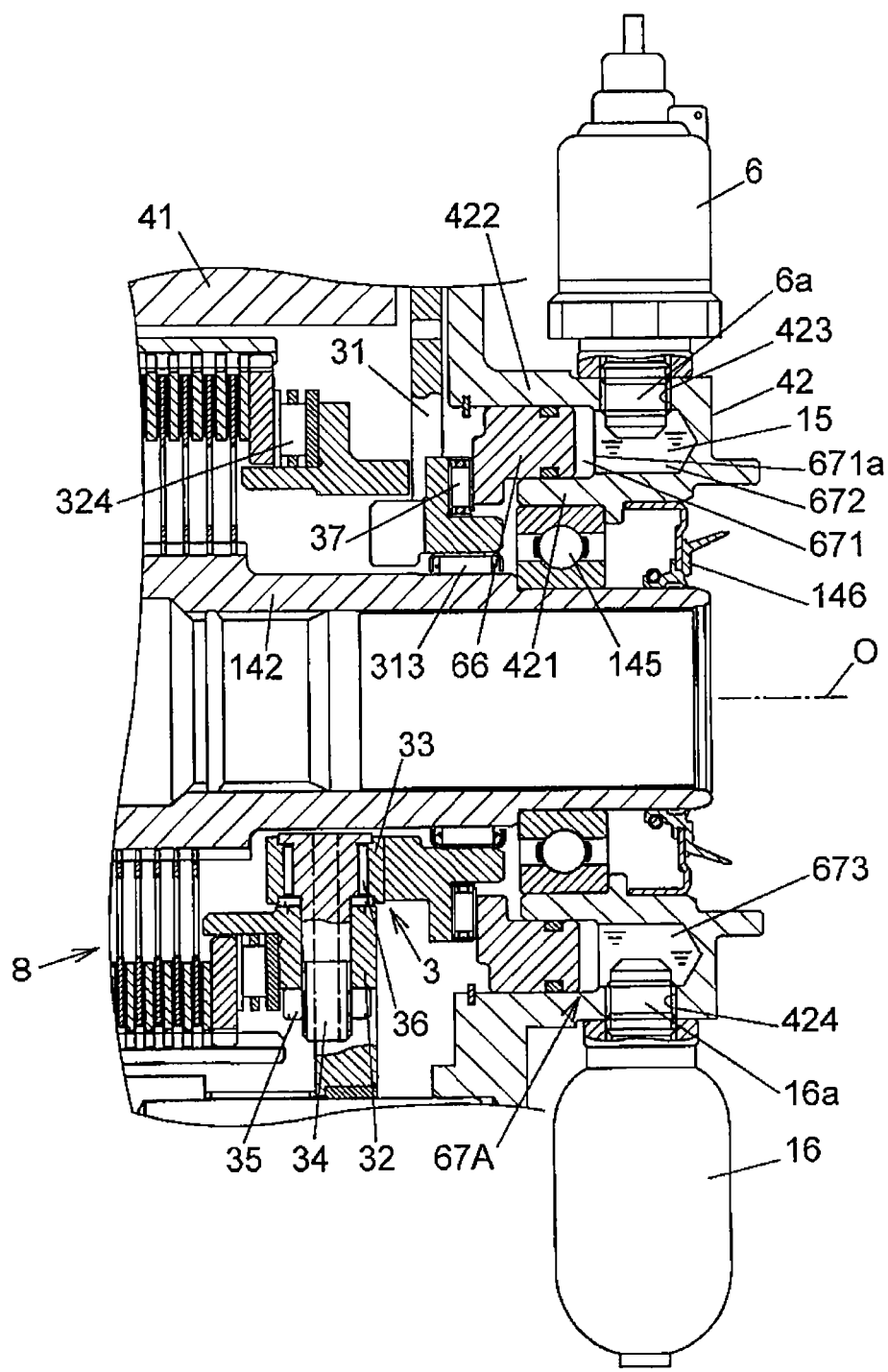
FIG. 20 is an enlarged sectional view illustrating a buffer, a detector and their surroundings in a driving force transmission apparatus according to a fifth embodiment of the invention.

FIG. 20 is an enlarged sectional view illustrating a buffer, a detector and their surroundings in a driving force transmission apparatus 11 according to the fifth embodiment of the invention.

In the driving force transmission apparatus 11 according to the present embodiment, the configuration of the buffer differs from the configuration of the buffer in the driving force transmission apparatus 11 according to the fourth embodiment. In the fifth embodiment, the buffer is an accumulator 16 that can accumulate the pressure of an accommodation portion 67A, that is, the fluid 15 in an amount corresponding to the reaction force applied from the cam member 31.

In the accumulator 16, a space defined by an elastic film such as a rubber film is filled with inert gas such as nitrogen. As the pressure inside the accommodation portion 67A is increased, the inert gas is compressed based on the pressure. Then, the fluid 15 flows into the space emptied due to the compression and accumulates in the space.

The accommodation portion 67A in the present embodiment is filled with the fluid 15 containing no air bubbles. As illustrated in FIG. 20, the accommodation portion 67A has the first accommodation portion 671, the second accommodation portion 672 and a third accommodation portion 673. The third accommodation portion 673 as well as the second accommodation portion 672 opens toward the bottom face 671a of the first accommodation portion 671, and extends in the direction parallel to the rotation axis O.

The third accommodation portion 673 is open at one position of the bottom face 671*a* of the first accommodation portion 671 in the circumferential direction. The second accommodation portion 672 and the third accommodation portion 673 open at different positions of the bottom face 671*a* of the first accommodation portion 671 in the circumferential direction. The third accommodation portion 673 as well as the second accommodation portion 672 is a round hole of which the deep part-side end portion is closed. The third accommodation portion 673 is formed by drilling, and has a tapered shape at the deep-part side.

A fitting hole 424 for fitting the accumulator 16 to the lid 42 is formed in the lid 42 so as to communicate with the third accommodation portion 673. In other words, the third accommodation portion 673 is formed at a position corresponding to the position at which the accumulator 16 is disposed. The fitting hole 424 is formed so as to be orthogonal to the third accommodation portion 673, one end thereof opens into the third accommodation portion 673, and the other end thereof is formed of a round hole that opens to the outside of the housing 4 (lid 42). An internal thread is formed on the inner face that defines the fitting hole 424, and an external thread formed on the outer face of a cylindrical portion 16*a* formed at an end portion of the accumulator 16 is screwed to the internal thread.

As the piston 66 receives the first reaction force $F_1$ and the second reaction force $F_2$ from the cam member 31 and is pressed toward the second accommodation portion 672 and the third accommodation portion 673 along the direction parallel to the rotation axis O, the fluid 15 inside the accommodation portion 67A is compressed. At this time, part of the fluid 15 flows into a container of the accumulator 16.

Thus, even if an impact is applied from the cam mechanism 3 to the fluid 15 due to, for example, sudden rotation of the electric motor 5 (refer to FIG. 2), part of the fluid 15 flows into (is pushed into) the container of the accumulator 16. As a result, the impact is absorbed.

According to the present embodiment, the operations and advantageous effects similar to the operations and advantageous effects (1) to (3) in the first embodiment are obtained.

Next, a sixth embodiment of the invention will be described with reference to FIG. 21.

In the sixth embodiment, the components having substantially the same functions as those in the first to fifth embodiments will be denoted by the same reference symbols and names as those in the first to fifth embodiments, and description thereof will be omitted.

Figure 21:
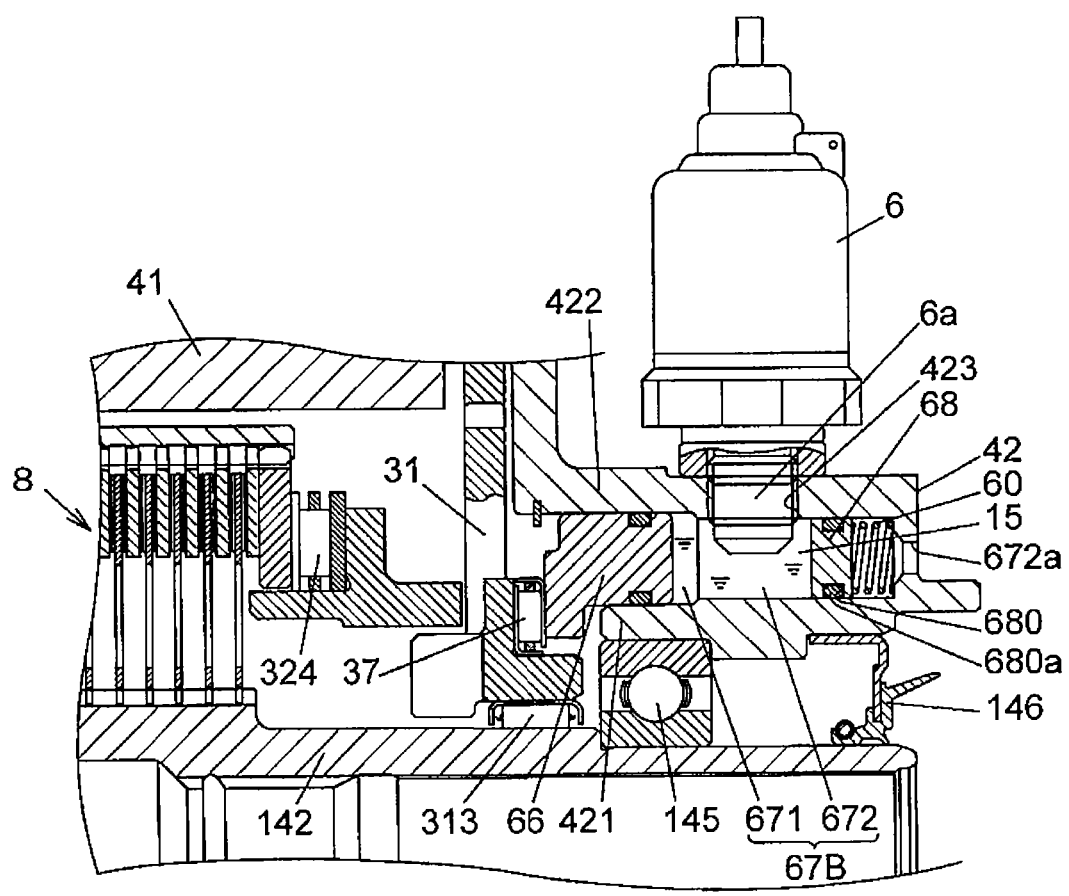
FIG. 21 is an enlarged sectional view illustrating a buffer, a detector and their surroundings in a driving force transmission apparatus according to a sixth embodiment of the invention.

FIG. 21 is an enlarged sectional view illustrating a buffer, a detector and their surroundings in a driving force transmission apparatus 11 according to the sixth embodiment of the invention.

In the driving force transmission apparatus 11 according to the present embodiment, the configuration of the buffer differs from the configurations of the buffer in the driving force transmission apparatus 11 according to the fourth and fifth embodiments.

In the present embodiment, the buffer has a spring member 60 and a pressing member 68. The spring member 60 is an elastic member elastically compressed by the pressing force of the fluid 15 that has received the first reaction force $F_1$ and the second reaction force $F_2$ from the cam member 31. Upon reception of the pressing force of the fluid 15, the pressing member 68 presses the spring member 60. In the present embodiment, the spring member 60 formed of a coil spring.

As in the fourth embodiment, an accommodation portion 67B has the first accommodation portion 671 and the second accommodation portion 672. The spring member 60 and the pressing member 68 are accommodated in the deep side (opposite side from the first accommodation portion 671) of the second accommodation portion 672. An air hole 672*a* that provides communication between an accommodation space for the spring member 60 and the outside of the housing 4 (lid 42) is formed in a deep-side end portion of the second accommodation portion 672.

The pressing member 68 has a columnar shape, and is disposed closer to the cam member 31 than the spring member 60 in the direction parallel to the rotation axis O. A seal holding portion 680 that holds a seal member 680*a* that comes into sliding contact with the inner peripheral face of the second accommodation portion 672 is formed in the outer peripheral face of the pressing member 68 along the entire periphery. The fluid 15 is sealed in a space between the piston 66 and the pressing member 68 inside the accommodation portion 67B. That is, the fluid 15 is in contact with one end face of the pressing member 68 and the spring member 60 is in contact with the other end face of the pressing member 68.

As the piston 66 receives the first reaction force $F_1$ and the second reaction force $F_2$ from the cam member 31 and is pressed toward the pressing member 68 along the direction parallel to the rotation axis O, the fluid 15 inside the accommodation portion 67B is pressed. The fluid 15 pressed by the piston 66 presses the pressing member 68 toward the spring member 60. The pressing member 68 that has received the pressing force of the fluid 15 presses the spring member 60 toward the deep side (air hole 672*a* side) of the second accommodation portion 672. The spring member 60 that has received the pressing force of the pressing member 68 is compressed in the axial direction. At this time, the reaction force corresponding to the compression is applied to the spring member 60, thereby pressing the pressing member 68 back toward the fluid 15. Then, a force that presses the fluid 15 back toward the piston 66 is applied to the pressing member 68 that has received the reaction force from the spring member 60. Therefore, the pressing member 68 also has a function as an elastic force applying member that applies elastic force of the spring member 60 (reaction force corresponding to the compression of the spring member 60) to the fluid 15.

Thus, even if an impact is applied from the cam mechanism 3 to the fluid 15 due to, for example, sudden rotation of the electric motor 5 (refer to FIG. 2), the spring member 60 is compressed via the pressing member 68. As a result, the impact is buffered.

According to the present embodiment, the operations and advantageous effects similar to the operations and advantageous effects (1) to (3) in the first embodiment are obtained.

The driving force transmission apparatus and the controller for the driving force transmission apparatus according to each embodiment of the invention have been described above. However, the invention is not limited to the above-described embodiments. The invention may be implemented in various other embodiments. For example, the above-described embodiments of the invention may be modified as described below.

(1) In the above-described embodiments, the driving force transmission apparatus 11 is disposed on the torque transmission path extending from the rear differential 22 to the right side rear wheel 105R. However, the invention is not limited to this, and the driving force transmission apparatus 11 may be disposed between the propeller shaft 20 and the rear differential 22.

(2) The configurations of the speed reduction mechanism 9 and the cam mechanism 3 are not limited to the above-described configurations. If the electric motor 5 is a direct drive (DD) motor or the like that generates high torque, the speed reduction mechanism 9 need not be provided.

With the driving force transmission apparatus and the controller for the driving force transmission apparatus according to the invention, it is possible to accurately adjust the thrust force of the cam mechanism that presses the clutch, and to reduce damage to the sensor that detects the reaction force.

What is claimed is:

1. A driving force transmission apparatus comprising:
   an electric motor;
   a clutch including a first friction member and a second friction member that are disposed coaxially with each other so as to be rotatable relative to each other and that are frictionally engaged with each other by being pressed in an axial direction;
   an input rotary member that rotates together with the first friction member;
   an output rotary member that rotates together with the second friction member;
   a cam thrust force generating mechanism that generates cam thrust force for pressing the clutch in the axial direction upon reception of torque generated by the electric motor;
   a detector that detects reaction force against the cam thrust force; and
   a buffer that buffers an impact transmitted from the cam thrust force generating mechanism to the detector.

2. The driving force transmission apparatus according to claim 1, wherein:
   the cam thrust force generating mechanism includes
      a cam member that rotates upon reception of the torque generated by the electric motor,
      a rolling member that rolls on a cam face formed in the cam member, and
      an output member that outputs the cam thrust force generated by rolling of the rolling member toward the clutch; and
   the cam member transmits the reaction force generated by reaction of the cam thrust force to the detector via the buffer.

3. The driving force transmission apparatus according to claim 2, wherein the buffer is a spring member.

4. The driving force transmission apparatus according to claim 3, wherein the detector includes a piezoelectric sensor that converts the reaction force into a voltage to detect the reaction force in a form of voltage.

5. The driving force transmission apparatus according to claim 2, wherein the buffer is a liquid sealed together with air bubbles in an accommodation portion formed in a housing in which the clutch and the cam thrust force generating mechanism are accommodated.

6. The driving force transmission apparatus according to claim 5, wherein
   the detector includes:
      a deformation member that is elastically deformed upon reception of the reaction force from the cam thrust generating mechanism; and
      a strain sensor that detects a deformation amount of the deformation member.

7. The driving force transmission apparatus according to claim 2, wherein the detector is a pressure sensor that detects a pressure of a fluid that is compressed upon reception of the reaction force from the cam thrust force generating mechanism.

8. The driving force transmission apparatus according to claim 7, wherein the buffer is formed of air bubbles that are sealed together with the fluid in an accommodation portion formed in a housing in which the clutch and the cam thrust force generating mechanism are accommodated.

9. The driving force transmission apparatus according to claim 7, wherein the buffer is an accumulator that is able to store the fluid in an amount corresponding to the reaction force.

10. The driving force transmission apparatus according to claim 7, wherein the buffer includes an elastic member that is elastically compressed by pressing force of the fluid that has received the reaction force.

11. A controller that controls the driving force transmission apparatus according to claim 1, the controller comprising a control unit that computes the cam thrust force based on a signal transmitted from the detector, and that controls the electric motor based on the computed cam thrust force.

12. The controller according to claim 11, wherein, based on the computed cam thrust force, the control unit corrects a map that defines a relationship between driving force to be transmitted from the input rotary member to the output rotary member and a command current value for the electric motor.

13. A driving force transmission apparatus comprising:
   an electric motor;
   a clutch including a first friction member and a second friction member that are disposed coaxially with each other so as to be rotatable relative to each other and that are frictionally engaged with each other by being pressed in an axial direction;
   an input rotary member that rotates together with the first friction member;
   an output rotary member that rotates together with the second friction member;
   cam thrust force generating means for generating cam thrust force for pressing the clutch in the axial direction upon reception of torque generated by the electric motor;
   a detector that detects a reaction force against the cam thrust force; and
   a buffer provided between the cam thrust force generating means and the detector for buffering an impact transmitted from the cam thrust force generating means to the detector.

* * * * *